US009511811B2

(12) United States Patent
Andreev

(10) Patent No.: US 9,511,811 B2
(45) Date of Patent: Dec. 6, 2016

(54) TWO-WHEELED GYROSCOPE-STABILIZED VEHICLE AND METHODS FOR CONTROLLING THEREOF

(71) Applicant: Sergey Nikolaevich Andreev, Saint-Petersburg (RU)

(72) Inventor: Sergey Nikolaevich Andreev, Saint-Petersburg (RU)

(*) Notice: Subject to any disclaimer, the term of this patent is extended or adjusted under 35 U.S.C. 154(b) by 0 days.

(21) Appl. No.: 14/405,510

(22) PCT Filed: May 19, 2014

(86) PCT No.: PCT/RU2014/000361
§ 371 (c)(1),
(2) Date: Dec. 4, 2014

(87) PCT Pub. No.: WO2015/009198
PCT Pub. Date: Jan. 22, 2015

(65) Prior Publication Data
US 2016/0031515 A1    Feb. 4, 2016

(30) Foreign Application Priority Data

Jul. 16, 2013   (GB) .................................. 1312717.0
Jul. 29, 2013   (EA) .................................. 201300914

(51) Int. Cl.
*B62K 3/00*      (2006.01)
*B60G 21/05*     (2006.01)
(Continued)

(52) U.S. Cl.
CPC ........... *B62K 3/007* (2013.01); *B60G 17/0165* (2013.01); *B60G 21/05* (2013.01); *B62D 37/06* (2013.01); *B62D 61/00* (2013.01); *B62D 61/02* (2013.01)

(58) Field of Classification Search
CPC ......... B62K 3/007; B60G 21/05; B62D 37/06; B62D 61/00
(Continued)

(56) References Cited

U.S. PATENT DOCUMENTS 3,399,742 A * 9/1968 Malick .................... B60T 1/06
                                                         180/21
7,370,713 B1   5/2008 Kamen
(Continued)

FOREIGN PATENT DOCUMENTS

JP   WO 2013088500 A1 *  6/2013  ............. B62K 3/007
RU         2333862 C1      9/2008
(Continued)

*Primary Examiner* — Jacob Knutson
(74) *Attorney, Agent, or Firm* — Hayes Soloway P.C.

(57) ABSTRACT

A two-wheel gyroscope-stabilized vehicle includes a stabilizing gyroscope, having a gyroscope frame and a gyroscope rotor rotatably mounted in the frame. The gyroscope frame is free to rotate relative to the vehicle body. The vehicle further comprises a support structure that connects the vehicle body and the vehicle wheels, wherein the supporting structure is adapted to move the wheels independently in relation to each other and to move the wheels in relation to the body independently thereof. The support structure helps to keep the vehicle stable when riding on rough terrain. Balancing of the vehicle is provided by maintaining a right angle between the axis of rotation of the gyroscope rotor and direction of the vehicle movement by means of the control system through changing the difference of rotation velocities of the wheels. Steering of the vehicle is provided by means of applying the roll control force to the body.

31 Claims, 19 Drawing Sheets

(51) Int. Cl.
  *B62D 37/06* (2006.01)
  *B62D 61/00* (2006.01)
  *B60G 17/0165* (2006.01)
  *B62D 61/02* (2006.01)

(58) Field of Classification Search
  USPC .... 701/36, 41, 49; 180/6.2, 6.24, 6.28, 6.44, 180/7.1, 221, 218, 316, 400, 410, 444; 280/208, 280/266, 282
  See application file for complete search history.

(56) References Cited

U.S. PATENT DOCUMENTS

| | | | |
|---|---|---|---|
| 7,640,086 B2 * | 12/2009 | Nakashima | B62K 3/00 180/6.5 |
| 7,647,999 B2 * | 1/2010 | Geiser | B60G 17/01908 180/210 |
| 7,717,200 B2 | 5/2010 | Kakinuma et al. | |
| 8,725,355 B2 * | 5/2014 | Quick | B62K 3/007 180/22 |
| 2009/0064805 A1 | 3/2009 | Naumov et al. | |
| 2009/0107240 A1 * | 4/2009 | Senba | A61G 5/04 73/514.36 |
| 2010/0023220 A1 * | 1/2010 | Nakashima | G05D 1/0272 701/42 |
| 2010/0121538 A1 * | 5/2010 | Ishii | B62D 51/005 701/48 |
| 2010/0219011 A1 * | 9/2010 | Shimoyama | B62D 37/04 180/218 |
| 2010/0292840 A1 * | 11/2010 | Ruan | B25J 5/007 700/259 |
| 2012/0215355 A1 * | 8/2012 | Bewley | B25J 5/005 700/258 |
| 2013/0147146 A1 | 6/2013 | Dunlap et al. | |
| 2013/0228385 A1 | 9/2013 | Chen | |
| 2014/0379198 A1 | 12/2014 | Amino et al. | |

FOREIGN PATENT DOCUMENTS

| | | |
|---|---|---|
| WO | 9414653 A1 | 7/1994 |
| WO | WO2013088500 A1 | 6/2013 |

* cited by examiner

TWO-WHEELED GYROSCOPE-STABILIZED VEHICLE AND METHODS FOR CONTROLLING THEREOF

CROSS-REFERENCE TO RELATED APPLICATIONS

This application is a continuation-in-part of International application PCT/RU2014/000361 filed on May 19, 2014 which claims priority benefits to Eurasian patent application EA 201300914 filed on Jul. 29, 2013 and Great Britain patent application No GB 1312717.0 filed on Jul. 16, 2014. Each of these applications is incorporated herein by reference for all purposes.

BACKGROUND OF THE INVENTION

1. Field of the Invention

The present invention relates to a vehicle designed for transporting of people or goods, and particularly relates to a two-wheel gyroscope-stabilized vehicle and methods for balancing and steering of such vehicle.

2. Description of the Related Art

Different single axle two wheeled vehicles are often used by pedestrians to facilitate their transportation. However, these vehicles have various disadvantages, such as large dimensions, insufficient lateral stability, while for steering such vehicles a user is often required to use both hands and develop some degree of skill in order to be able to maintain balance.

There are different human activities associated with a lot of walking (e.g. waiter, seller, buyer, museum staff, office employee, airport staff, warehouse staff, etc.) where a compact and sustainable vehicle allowing a user to steer hands free would benefit such a person greatly and free him up to do more things. In addition there is a large group of people with limited motor function, whose life can be made easier with a device that could help them move around easily.

Finally, such a device can be used as a chassis for various types of automated devices such as robots where such a device needs to be able to move around in small spaces.

Known in the art are various two-wheel vehicles for moving people or goods, and their corresponding control methods.

Specification of U.S. Pat. No. 7,717,200 discloses a vehicle comprising a body and two wheels. The vehicle further comprises step supports to hold up legs of the rider, a steering handle and a suspension which connects the wheels to the body and which is placed under said step supports. The suspension comprises parallel link mechanism with elastic members disposed between the parallel links so as to generate a spring force applied to the body maintaining said step plate parallel with said body. To stabilize the vehicle the rider uses a steering handle mounted on the body of the vehicle which is able to lean to a side by moving the handle laterally. Stabilization of the vehicle is additionally provided by a wide wheelbase. Steering and balancing of said vehicle require special skills and the rider is unable to use it hands free.

Further, specification of U.S. Pat. No. 7,370,713 discloses a coaxial two-wheel vehicle. Lateral stabilization of the vehicle is provided by a wide wheelbase, and steering is provided by rotation of a steering handle mounted on a base of the vehicle. The vehicle has large overall dimensions, requires constant interaction of the user's hands with the handle during riding and also do not allow hands free operation.

Further, specification of Russian Patent No. 2333862 discloses a vehicle for carrying a load. The vehicle comprises a body, a platform and wheels supporting the platform. The vehicle further comprises moving mass and gyroscopes mounted on the body so as to stabilize the vehicle. The gyroscopes are mounted on the platform so that the axes of rotation of the gyroscope rotors are vertical. Stabilization of the vehicle is additionally provided by a flywheel mounted on the platform. Therefore, stabilization of the vehicle is provided by number of devices that complicate the construction of the vehicle.

Thus, there is a need for a two-wheel vehicle with coaxial wheels that has simple construction, may be stabilized and steered in a simple manner and has small overall dimensions.

SUMMARY OF THE INVENTION

The goal of the present invention is to provide a two-wheel vehicle, which is free of the above mentioned disadvantages and particularly has small lateral dimensions, so that it can be used in tight spaces, indoor, and is laterally stable at the same time.

These goals can be met by a two-wheel gyroscope-stabilized vehicle claimed herein. The vehicle comprises a body, two wheels, a supporting structure that connects the body and the wheels, two wheel motors each connected to the corresponding wheel, a gyroscope, comprising a gyroscope rotor and a gyroscope frame, wherein the rotatable gyroscope frame is mounted on the body. The vehicle further comprises at least one angle sensor mounted on the body so as to detect the gyroscope frame rotation relative to the body. The vehicle is characterized in that the supporting structure is adapted to move the wheels independently in relation to each other and in relation to the body, and the control system is further adapted to apply a torque to the gyroscope frame.

The vehicle according to the invention has small lateral size, thus the vehicle may be used in a restricted spaces. The vehicle is stable in lateral direction due to gyroscope torque and prolonged stabilization is achieved by rotating the vehicle body to follow the rotation of the gyroscope frame. Stability of the vehicle is also provided by moving the wheels in relation to each other and in relation to the body, thus the wheels may be kept in contact with the ground and the vehicle may rotate around its axis of rotation despite of unevenness of the ground. Further, due to independent movement of the wheels relative to the body no unwanted (side leaning) moment is applied to the body and no unwanted rotation of the body may occur.

Further, claimed herein is a two-wheel gyroscope-stabilized vehicle for carrying a rider with step supports for the rider's legs. The vehicle has small lateral size, thus the vehicle may be placed between the rider's legs. The vehicle is stable in lateral direction and may be steered in a simple way by inclining the center of mass of the rider while the hands remain free during the steering. The step supports may be equipped with additional control means for fast change to the vehicle movement direction. To make the vehicle more convenient for the rider the vehicle may be equipped with a seat to accommodate the rider and a handle to provide additional support for the rider.

Further, claimed herein is a two-wheel gyroscope-stabilized vehicle for carrying a load. The vehicle comprises a platform for carrying the load and may be used as a chassis of a robot. The vehicle has small lateral size, thus it may be used for transportation of goods or loads in a restricted space. Due to high stability the vehicle provides transportation in a safe manner. The platform for carrying the load may also include means for attaching the load to the vehicle.

Lateral stability of the vehicle is achieved by implementation of a method for controlling the vehicle according to the invention. The method comprises the steps of measuring the angle of rotation of the gyroscope frame relative to the body on application of a disturbing force, and changing the difference of rotation velocities of the wheels in order to adapt to the angle of rotation. Thus, the vehicle may be laterally stabilized during the application of a disturbing force without use of additional means. The gyroscope frame rotation relative to the body is constantly measured by the angle sensor, thus a signal may be timely sent to the control system and the velocities of the wheels may be timely changed to rotate the vehicle body following the rotation of the gyroscope frame and thus maintain stabilizing action of the gyroscope.

Directional controlling of the vehicle according to the invention may be provided by the control method claimed herein. The method comprising the steps of applying the roll control force to the body, measuring the angle of rotation of the gyroscope frame relative to the body, and changing the difference of rotation velocities of the wheels according to the angle of rotation so as to control the direction of the vehicle movement.

The method may be used to provide simple and effective way to steer the vehicle.

Particularly, measuring the angle of rotation of the gyroscope frame is provided by measuring the angle of deflection of the gyroscope frame and the axis of rotation of the gyroscope rotor connected with the frame from position in which the axis of rotation of the gyroscope rotor is perpendicular to the second vertical plane, and the roll control force is applied to the body by means of for example movement of the control load (in case of a vehicle carrying a load) or by means of inclining the center of mass of the rider (in case of the vehicle for carrying a rider).

BRIEF DESCRIPTION OF THE DRAWINGS

Following is the detailed description of preferred embodiments of the present invention with reference to accompanying drawings, wherein.

DESCRIPTION OF THE PREFERRED EMBODIMENTS

Prior to describing the structure of the preferred embodiments, certain geometric terms will be set forth in order to ease the understanding of structural features of the disclosed invention; said terms will be referenced hereinafter.

In the figures, identical structural elements of the vehicle are denoted with identical reference numbers.

Figure 1:
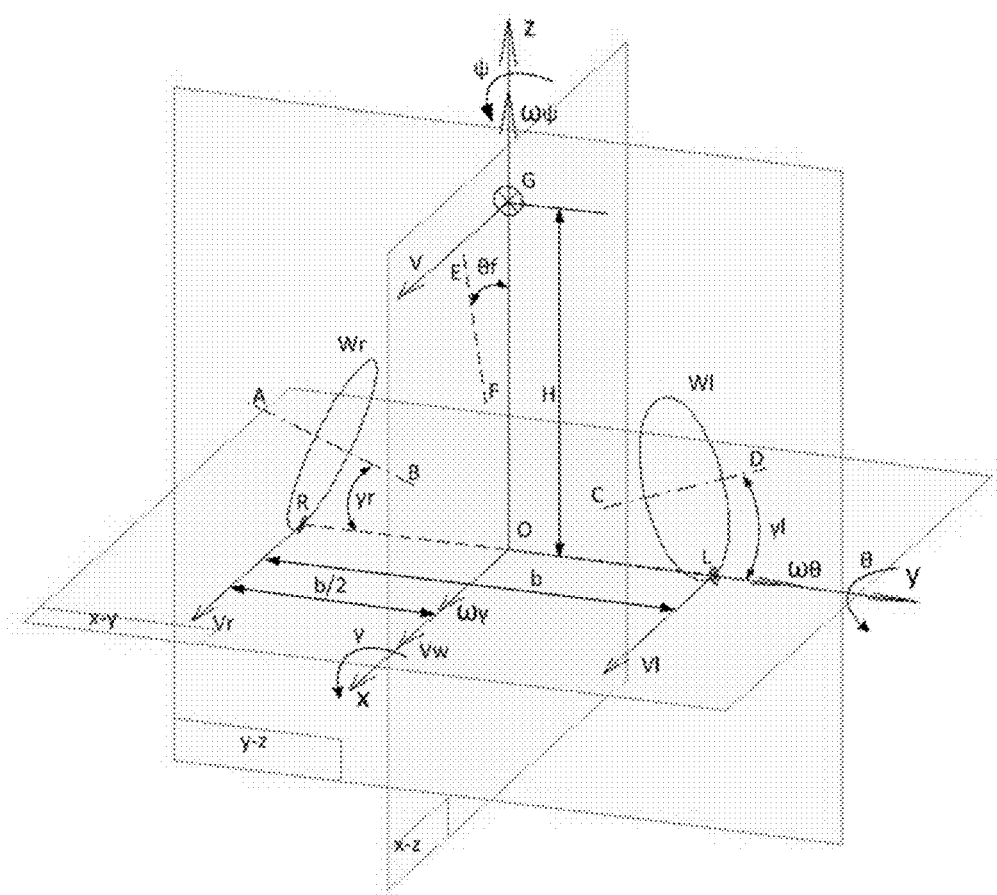
FIG. 1 shows the arrangement of working planes, points, axles and angles of the vehicle according to the present invention.

FIG. 1 shows the arrangement of working planes, points and angles of the vehicle according to the present invention in a position of the vehicle during uniform rectilinear movement thereof. Axes of rotation AB and CD of the vehicle wheels are located in the first vertical (transverse or side) plane (y-z), with the second vertical (longitudinal) plane (x-z) passing in a perpendicular direction thereto through the center G of mass. The third plane perpendicular to said vertical planes is the horizontal support plane (x-y), along which the vehicle travels. Circles $W_r$, $W_l$ are simplified illustrations of wheels, and points R and L are contact points of the left and right wheel, respectively, with the horizontal support plane (x-y). Axis $\omega_\psi$ is the vehicle yaw axis, axis $\omega_\gamma$ is the vehicle roll axis, axis $\omega_\theta$ is the vehicle pitch axis, and angles $\psi$, $\gamma$ and $\theta$ are the yaw angle, the roll angle, and the pitch angle, respectively. Angle $\gamma_r$ is the tilting angle of the right wheel axle in the first vertical plane (y-z), and angle $\gamma_l$ is the tilting angle of the left wheel axle in said plane. For clarity, said wheel axles are shown significantly tilted from the position parallel to the horizontal support plane (x-y). Terms "right" and "left" are determined with respect to the direction of vehicle movement, coinciding with the direction of roll axis $\omega_\gamma$ of the vehicle. The axis of rotation of the gyroscope frame is denoted EF, and said rotation can take place in the second vertical plane (x-z) at angle $\theta_f$ around the pitching axis $\omega_\theta$, wherein said angle is within the range of between −30 to +30 degrees, and the initial position of the rotation angle of axis EF is at the point in which said axis coincides with the straight line formed at the intersection of said longitudinal (x-z) and transverse (y-z) planes. Center G of mass of the vehicle is located at the height H from the intersection point O of the axes $\omega_\psi$, $\omega_\gamma$ и $\omega_\theta$, wherein the vehicle body is schematically shown as line segment GO and arranged vertically. The distance between the support points of the wheels (wheelbase) is denoted as b. V, $V_r$ and $V_l$ are, respectively, the linear travel speed of the center G of mass, the linear travel speed of the right wheel, and the linear travel speed of the left wheel.

Figure 2:
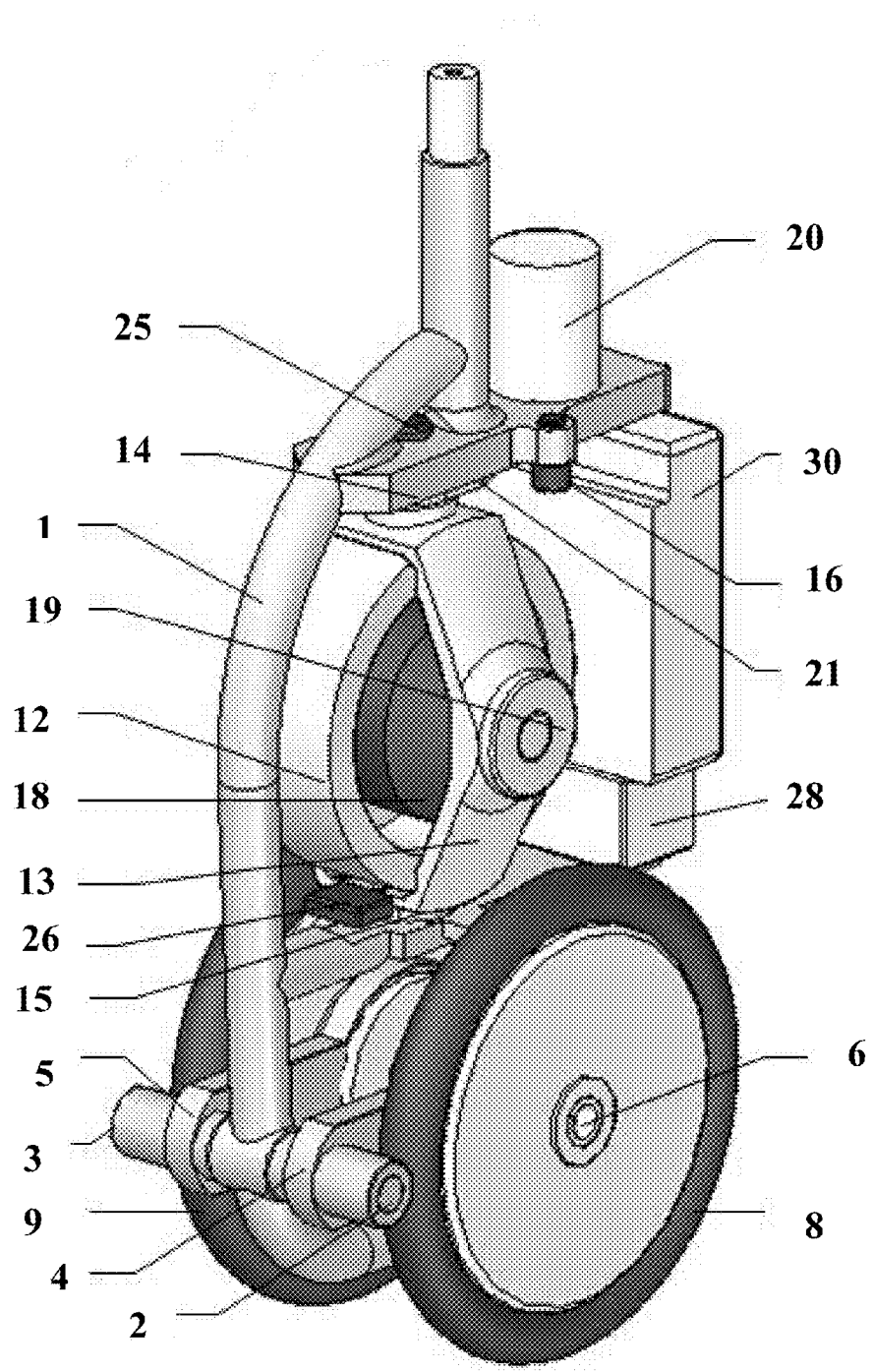
FIG. 2 is a front and side view of the vehicle according to one embodiment of the present invention.
Figure 3:
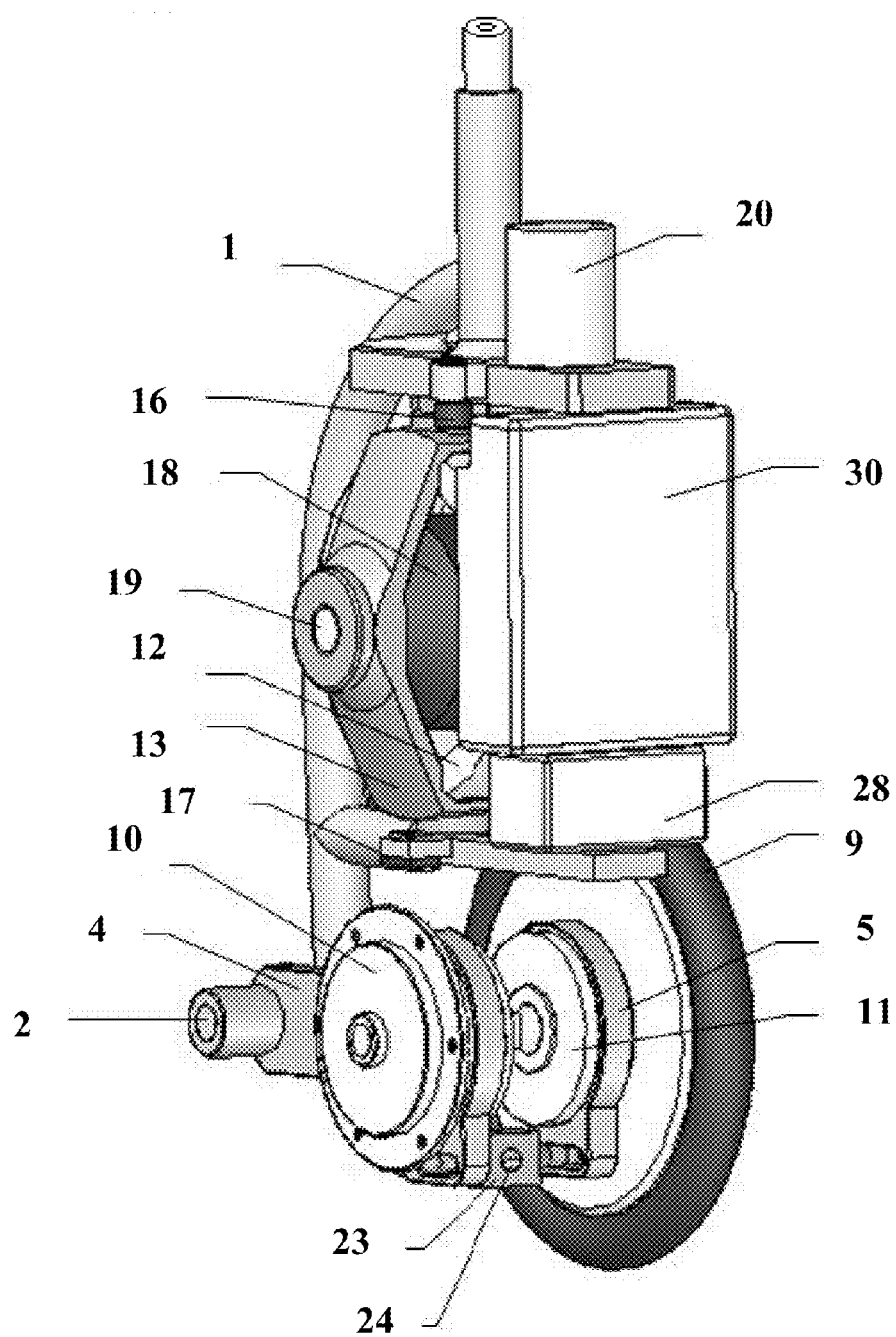
FIG. 3 is a rear and side view of the vehicle shown in FIG. 2, in which the left wheel is not shown for clarity reasons.

FIGS. 2-3 show the vehicle according to one embodiment of the present invention.

Figure 5:
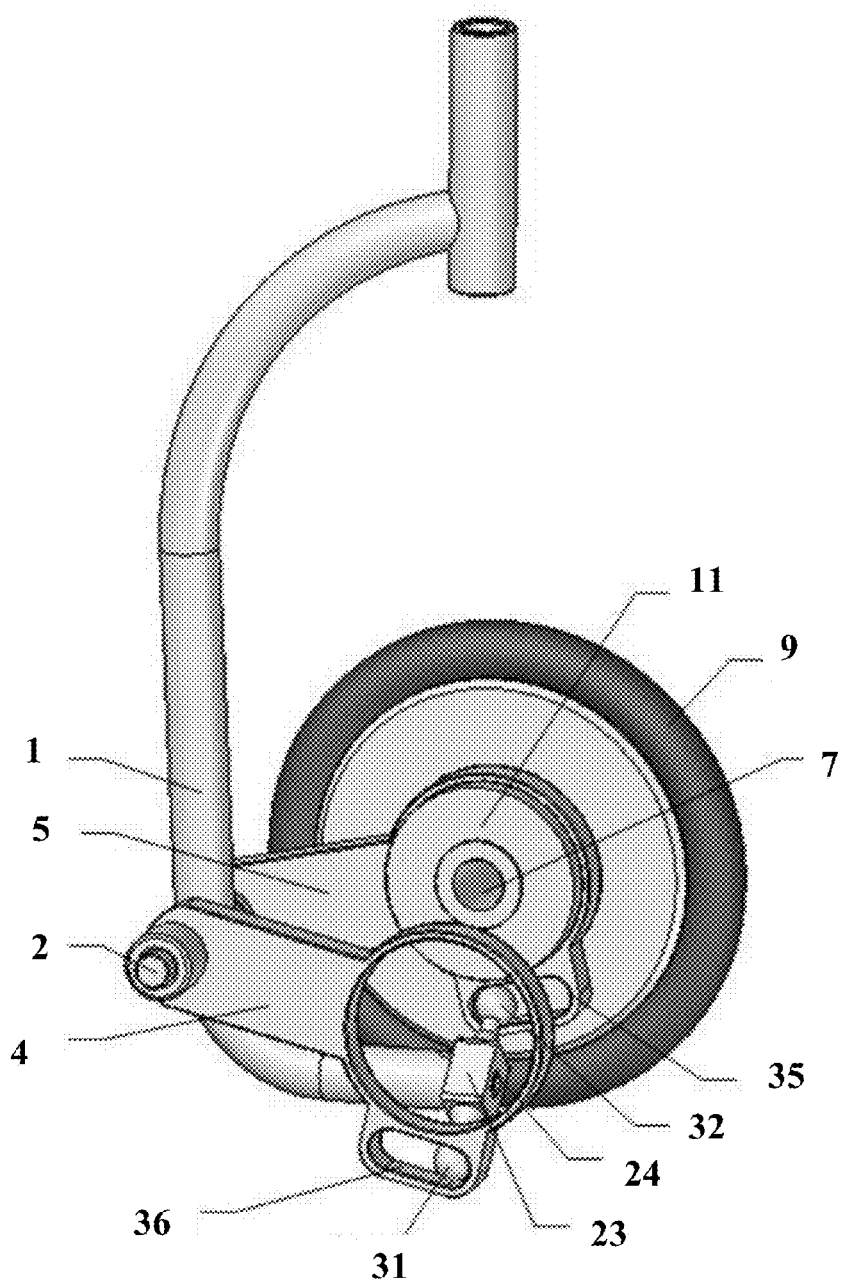
FIG. 5 is a partial view illustrating the position of the support structure shown in FIG. 4, when the vehicle runs over an obstacle.

The vehicle comprises a body 1 of the vehicle shown schematically in the figures as a frame structure with support structure connected thereto. The body 1 comprises a left pin 2 and a right pin 3. A left lever 4 of the support structure and a right lever 5 of the support structure are rotatably mounted on pins 2, 3. Said rotatability is provided due to the fact that levers 4, 5 are mounted on pins 2, 3 in rolling-contact bearings. The displacement of levers 4, 5 during rotation around pins 2, 3 in the vertical plane is limited by stops (not shown). The opposite ends of levers 4, 5 comprise wheel axles 6, 7 with a left wheel 8 and a right wheel 9 of the vehicle rotatably mounted thereon (axle 7 is arranged symmetrically with respect to axle 6 and is shown in FIG. 5). Wheels comprise rims and pneumatic tires or tires made of an elastic material. Left drive 10 and right drive 11 for rotating the wheels 8, 9 of the vehicle are also mounted on said axles. Each drive 10, 11 comprises a motor, a reduction unit and a power amplifier.

The vehicle further comprises a rate gyroscope comprising a massive rotor 12 and a frame 13 with rotor 12 rotatably mounted therein. Frame 13 is connected to the body 1 with bearing supports 14 and 15, said supports comprising bearings mounted in the body 1. Thus, rotation of frame 13 with respect to body 1 is allowed. The rotation angle of frame 13 is limited by gyroscope frame stops 16 and 17. Rotor 12 is mounted in the frame 13 in bearings, and is driven at high velocity by a separate gyroscope rotor drive 18. The axis 19 of rotation of the gyroscope rotor is arranged horizontally substantially parallel to axes of the wheels 8, 9 and substantially perpendicular to the direction of movement. The direction of rotor rotation coincides with the direction of wheel rotation.

The vehicle further comprises a torque drive 20 mounted on the body 1 and adapted to apply a torque to the frame 13. Torque drive 20 can be, for example, electrical torque drive comprising an electromotor with a reduction unit and a power amplifier, which transforms a control signal into electromotor current. Torque is transferred from the torque drive 20 through a segment gear 21 to frame 13 which rotates in bearing supports 14 and 15 around a vertical axis.

A load bearing rocker 23 is mounted on the body 1. Said rocker 23 is mounted on the body 1 rotatably with respect to axle 24 of the rocker and comprises a left end and a right end formed by ball ends.

An angle sensor 25 of the gyroscope frame is mounted on the frame 13 and detects the angle of rotation of the gyroscope frame with respect to body 1 in bearing supports 14 and 15 around the vertical axis. The initial position of sensor 25 corresponds to the position of rotor 12, in which the angle between the axis of rotation of the rotor and the axis of roll is 90 degrees. The angle of difference between said axes varies between zero and an angle corresponding to the position of frame 13 when it is rotated up to the stops 16, 17, wherein the sensor 25 is adapted to send a signal proportional to said angle of difference.

An angular velocity gyroscopic sensor 26 is also mounted on the gyroscope frame 13. Said sensor measures angular velocity of precession of the gyroscope rotor 12 and is adapted to send a signal proportional to the velocity of precession of the rotor 12.

The vehicle further comprises a control system 28 received in the control system body, said body comprising an on-board system computer, angular velocity gyroscopic sensors of pitching and roll rotation of body 1, and a transmitter, e.g. a wireless transmitter for receiving drive control signals and for transmitting a remote data signal to an external user. The control system comprises an on-board computer with a microcontroller having sufficient processing power and required peripheral devices (e.g. STM32F3 series microprocessors), said computer is received in the control system body and adapted to receive data from said gyroscopic sensors and sensors 25, 26, to process said data, and to transfer corresponding control signals to amplifiers of drives 10, 11, which transform control signals received from system 13 into current of said drives and change the rotational velocity of wheels 8, 9.

A battery 30 and/or an electric energy generator (not shown) is used as a self-contained power supply for vehicle drives as well as for the control system.

Figure 4:
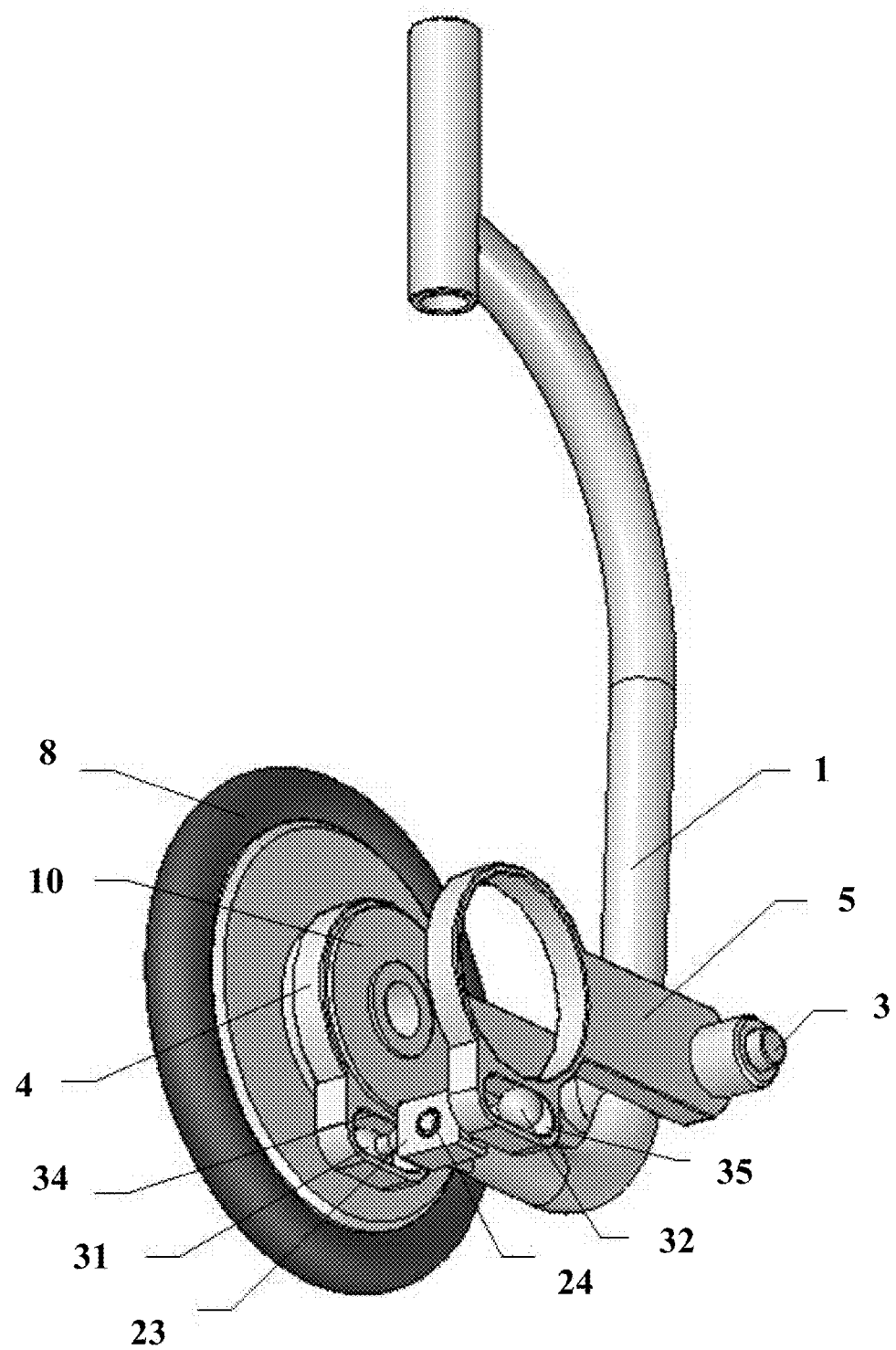
FIG. 4 is a partial view illustrating the support structure according to one of the embodiments thereof in the position, in which the vehicle moves rectilinearly and uniformly.

FIGS. 4-5 show a partial view illustrating the attachment of rocker 23 to the body 1 and changing of position of said rocker 23 when the vehicle runs over an obstacle.

The rocker 23 is mounted on the axle 24 of the rocker by means of a bearing, thus providing rotation thereof with respect to said axle 24. Ball ends 31, 32 of the rocker 23 are received in figured slots 34, 35 in the left lever 4 and the right lever 5 of the support structure equidistant from the center of rocker 23, forming ball joints. Thus the weight of the vehicle is distributed evenly between wheels 8, 9.

Figure 6:
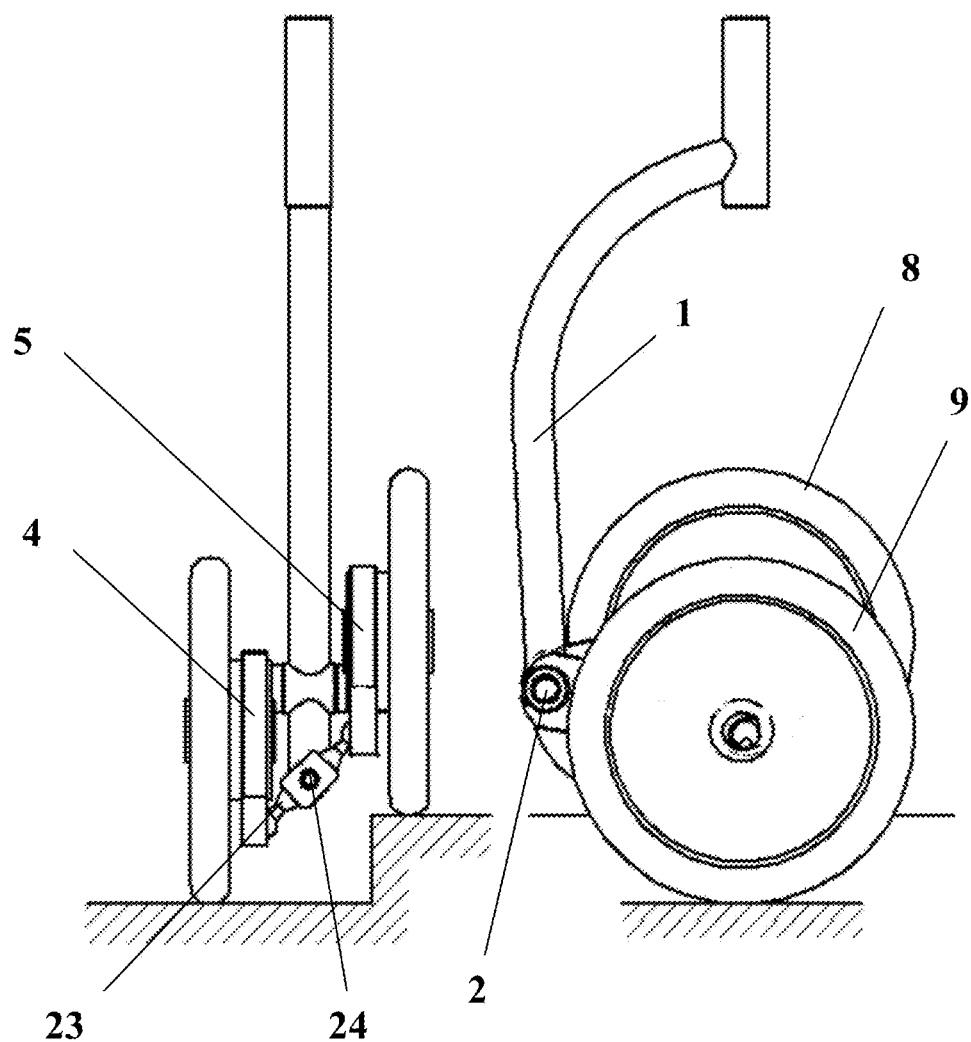
FIG. 6 is a schematic illustration of the support structure operation when the vehicle runs over an obstacle.

FIG. 6 is a schematic illustration of the support structure operation when the vehicle moves over a rough surface. During movement over a rough surface, levers 4, 5 rotate around pins 2, 3 at equal angles in opposite directions, while rocker 23 also rotates, and ball ends 31, 32 slide over the surfaces of figured slots 34, 35, thus the weight of the vehicle is transferred to wheels 8, 9. When the vehicle runs over an obstacle with one wheel 8 or 9, body 1 is displaced vertically at a distance equal to half of the obstacle height, and the support structure does not transfer a disturbing torque to body 1 along the roll axis, and wheel axes remain substantially in one vertical plane.

Figure 7:
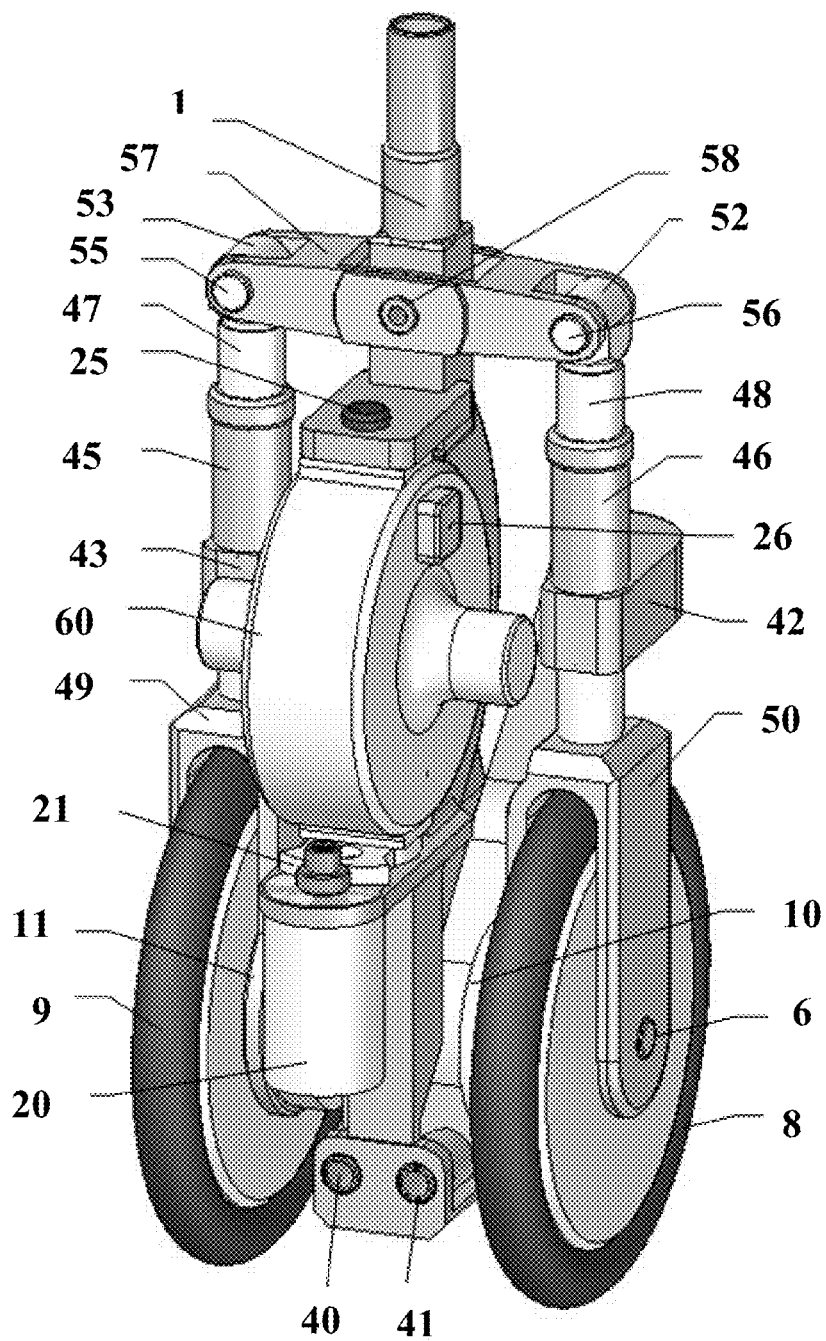
FIG. 7 is a front and side view of the vehicle according to another embodiment of the present invention.
Figure 8:
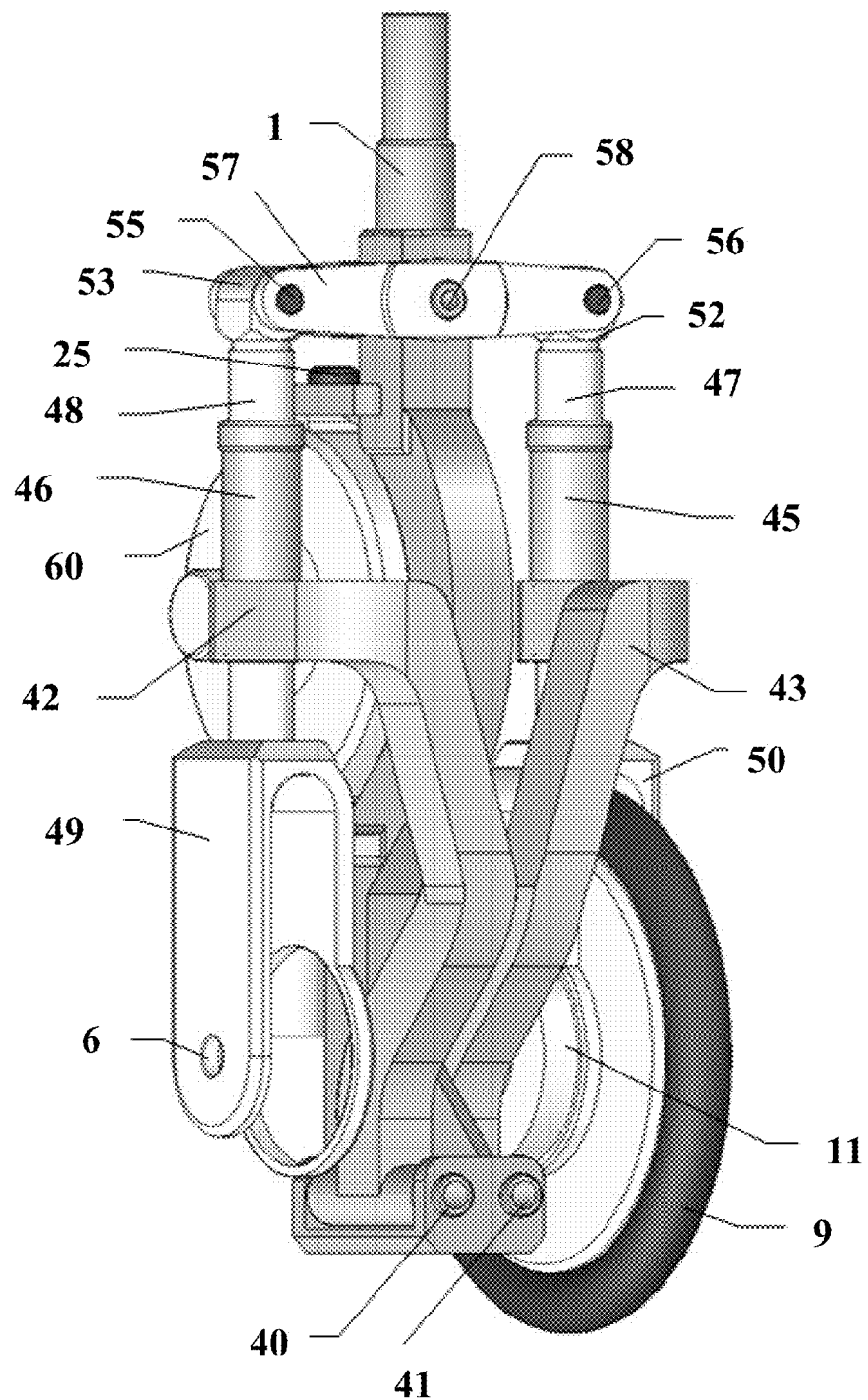
FIG. 8 is a rear and side view of the vehicle shown in FIG. 7, in which the left wheel is not shown for clarity reasons.

FIGS. 7-8 show the vehicle according to another preferred embodiment, said vehicle comprising a different support structure. According to this embodiment, the support structure comprises two pivots 40 and 41 connected to the body 1. A left swiveling link 42 and a right swiveling link 43 are rotatably mounted on pivots 40, 41 and adapted to rotate around said pivots. Barrels 45, 46 are fixedly mounted on swiveling links 42, 43. Cylindrical supports 47, 48 are mounted in the barrels 45, 46 and adapted to be displaced in longitudinal direction with respect thereto. A drive crutch 49, 50 comprising an opening for receiving a drive 10, 11 is attached to the lower end of each support 47, 48. Ball ends 52, 53 are placed at the upper end of each support 47, 48 and comprise openings, with axles 55, 56 of supports 47, 48 mounted into said openings on bearings. Drives 10, 11 are fixed in the openings of drive crutches 49, 50 on axles 6, 7. The support structure further comprises an equal-arm load bearing rocker 57 rotatably mounted on body 1 by means of axle 58 of the rocker and adapted to rotate around said axle. In some cases, the axle 58 can be formed by two cylindrical members mounted coaxially in the body 1. Rocker 57 has openings at the ends thereof, and axles 55, 56 of supports 47, 48 are rotatably mounted therein.

The vehicle shown in FIG. 7-8 further comprises a rate gyroscope, wherein the rotor comprises an axis of rotation arranged horizontally and perpendicular to the direction of movement, and a rotor drive, wherein said rotor and said drive are received in the body 60 functioning as a gyroscope frame.

Figure 9:
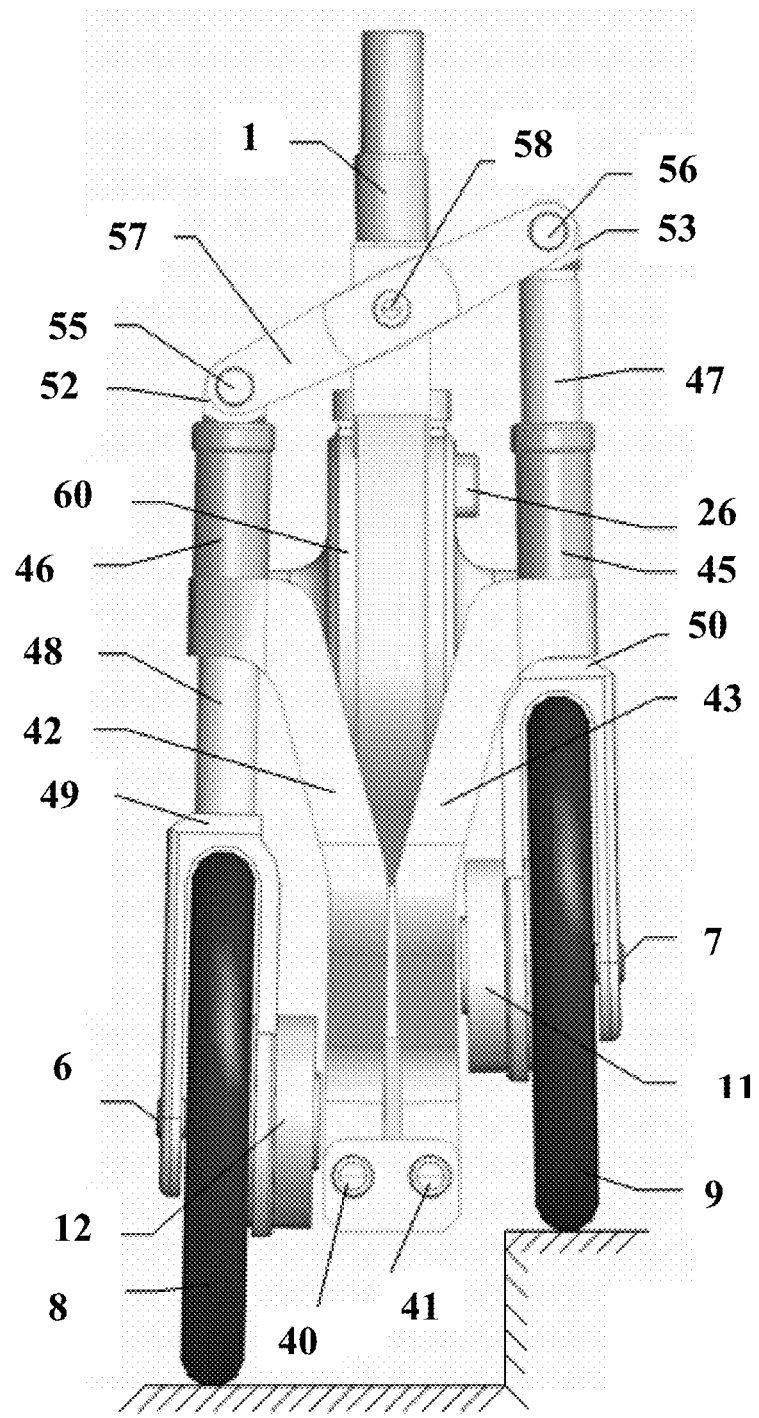
FIG. 9 is an illustration of the support structure operation when the vehicle runs over an obstacle.

FIG. 9 is an illustration of the support structure operation when the vehicle runs over an obstacle. The support structure is operated as follows. On a smooth surface, the weight of the vehicle with a load placed on body 1 is transferred to the surface via axle 58 to rocker 57. Rocker 57 transfers the weight of the vehicle through axles 55, 56 of the supports to ball ends 52, 53, supports 47, 48, drive clutches 49, 50, drives 10, 11, wheel axles 6, 7 and wheels 8, 9 equally. Furthermore, rocker 57 transfers the weight through axles 55, 56 of the supports and keeps supports 47, 48 from rotating around a vertical axis, thus axes of rotation of the wheels are kept in one plane. Longitudinal and transverse position of the wheels is fixed by barrels 45, 46, supports 47, 48 and swiveling links 42, 43.

When right wheel 9 encounters an obstacle, right wheel 9 and support 47 are elevated with respect to body 1 and are displaced progressively upwards in the barrel 45, whereby rocker 57 is rotated around the axle 58 of the rocker. When the rocker 57 rotates, the axis 56 of the support is displaced sideways. Said displacement causes the swiveling link 43 to rotate at a small angle in transverse plane around pivot 41. Along with the swiveling link 43, support 47, drive crutch 50 and right wheel 9 are also rotated at a small angle in transverse plane. Left wheel 8 is thereby lowered with respect to the body and displaced progressively downwards in the barrel 46. As described above, the rotation of rocker 57 leads to the rotation of swiveling link 42, support 48, drive crutch 49 and wheel 8 around pivot 40 at a small angle which is substantially equal to the angle of rotation of the other swiveling link. Body 1 is thereby elevated at a distance equal to half of the obstacle height. Thus disturbing torque is not transmitted from the obstacle to the body and the gyroscope rotor, and axes of rotation of the wheels remain in one vertical plane.

At low movement velocities roll stabilization of the vehicle comprising a support structure which applies no roll torque to the vehicle body, is performed using gyroscopic torque exclusively. When a disturbing roll torque acts upon the vehicle, and consequently, upon the gyroscope rotor 12 fixed in the gyroscope frame 13 on the body 1, rotor 12 precesses freely and the frame 13 rotates therewith around the axis of the frame. The gyroscopic torque is exactly equal to the disturbing torque, and no rotation around the roll axis occurs. The body 1 of the vehicle remains in initial position. If the disturbing influence is sufficiently continuous, the gyroscope frame 13 turns up to the stops 16, 17 of the frame that inhibit free precession of rotor 12. In this case, the body 1 of the vehicle will generally perform a complex movement caused by gyroscopic torques, rotating around the roll axis and the directional axis simultaneously. The ratio of rotation velocities will be determined mostly by the ratio of inertia torques and friction forces along the corresponding axes. Thus, a non-zero tilting velocity of body 1 for the roll angle is formed, and consequently, due to the fact that passive roll stabilization is substantially absent, the vehicle can fall over even when affected by a low torque. Therefore, the vehicle with a gyroscope and a support structure which applies no roll torque to the vehicle body possesses only short-term stability without taking special measures. In order to provide constant stability by the gyroscope, it is necessary to provide the possibility of free precession of the gyroscope rotor over the whole duration of disturbing torque action.

Figure 10:
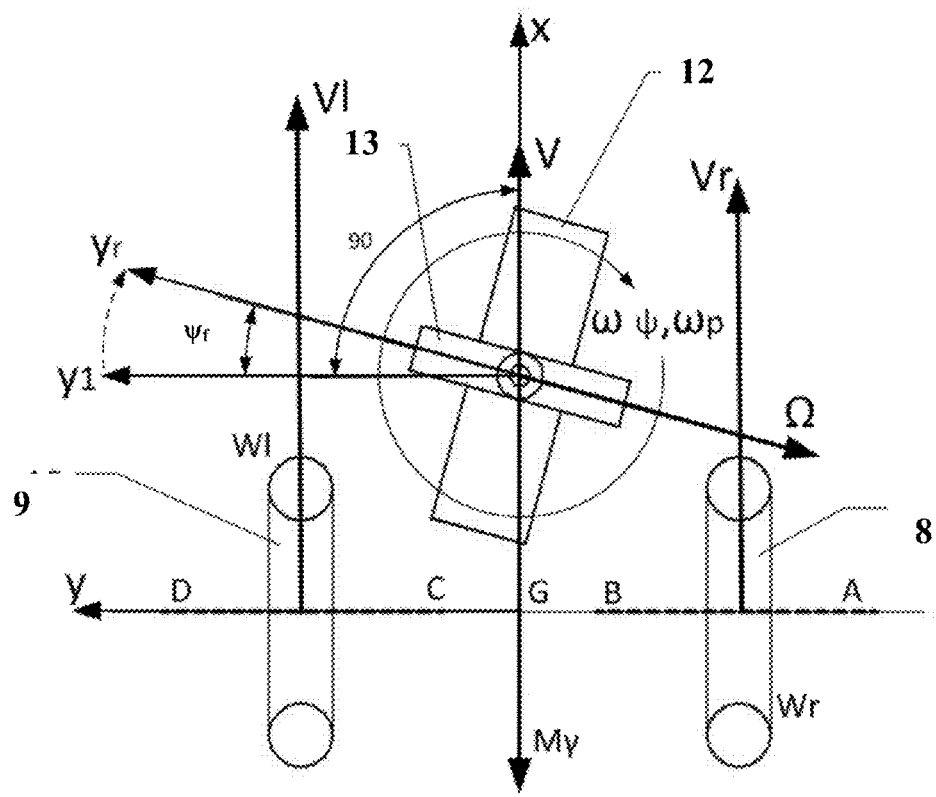
FIG. 10 is a schematic illustration of force and torque action in implementation of the method for controlling disclosed in the present invention.

In the present invention, the continuous stabilizing action of the gyroscope is achieved by using a specific vehicle control method. FIG. 10 is a top view of a chart of forces and torques affecting the vehicle when said method is used.

In order to control the vehicle movement to maintain the stabilizing action of the gyroscope (to provide the possibility of free rotor precession), body 1 is rotated together with wheels Wl and Wr around a vertical axis with instantaneous velocity $\omega_\psi$, following the gyroscope rotor 12 which precesses under the effect of roll disturbing torque $M\gamma$ (torque axis shown) with velocity $\omega_p$ of rotor precession, thus maintaining a 90-degree angle between axis $y_r$ of rotor rotation and roll axis x.

Such rotation is performed using the control system 28 comprising an angle sensor 25 that measures the gyroscope frame 13 rotation with respect to body 1. The mean position of sensor 25 with respect to body 1 is adjusted in such manner that zero signal at the output thereof corresponds to such position of frame 13, in which axis $y_r$ of the gyroscope rotor is parallel to the first vertical plane (y-z) and perpendicular to the roll axis x. Therefore, angle sensor 25 produces a signal proportional to the angle $\psi_f$ of deviation of axis $y_r$ of the rotor from a position, in which axis $y_r$ of the rotor is perpendicular to axis $M\gamma$ of the disturbing torque.

Figure 11:
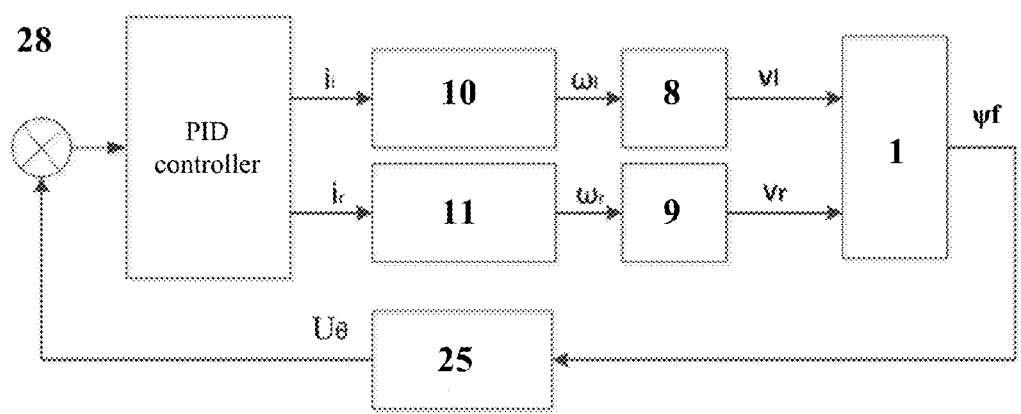
FIG. 11 is a schematic illustration of the control system of the disclosed vehicle.

FIG. 11 shows the operation of control system 28 when using said method. When a signal proportional to the value of angle $\psi_f$ of deviation is obtained from angle sensor 25, the control system 28 produces two control signals inputted into the power amplifiers of drives 10, 11, which change the difference in rotational velocities of wheels 8, 9 in such manner that the rotational velocity of one wheel is increased, and the rotational velocity of the other wheel is decreased by the same value (or the wheels are rotated in an opposite direction, if the longitudinal velocity of the vehicle is zero). Such difference in rotational velocities leads to a difference in velocities Vl and Vr of wheel movement and to rotation of body 1 and wheel axles around a vertical axis. The value of angular velocity cow of rotation of body 1 is thus proportional to the difference in velocities Vl and Vr of wheel movement and to the wheelbase b. Control of said velocity is performed according to PID control principle in order to maintain the difference between angular velocity ωp of rotor 12 precession and angular velocity ωψ of rotation of body 1, as well as the value of the angle $\psi_f$ of deviation at zero value. Therefore, the operation of control system 28 results in that the rotor axis 27 deviates from the required position by a small value determined by dynamic transitional processes in the control system, and subsequently, the continuous gyroscopic stabilization of the vehicle is achieved.

The disturbing torque can be internal and external. The difference between the two types is that the direction of movement of the external torque does not change upon rotation of the vehicle, while the direction of movement of the internal torque rotates along with the vehicle body. For example, the external torque can be formed by the force of wind blowing in transverse direction. When affected by said torque, the body will rotate in such way that the transverse effect of the disturbing force will decrease, and the longitudinal effect will increase until the body rotates by 90 degrees, and the transverse effect reaches zero. The external disturbing effect will be compensated by the control system 28 according to pitching angle by tilting body 1 and forming a force equal in strength and opposite in direction to the external force.

When affected by the internal torque, the vehicle rotates at a constant angular speed proportional to the torque and current velocity.

The roll torque caused by the control system leads to rotation of body 1 and associated wheels 8, 9 around a vertical axis. The direction of movement of the vehicle is perpendicular to the line connecting contact points between wheels and the surface. The vehicle velocity vector is rotated along with the rotation of wheels. Therefore, it is possible to control the direction of vehicle movement by forming a predetermined roll control torque.

In order to control the direction of movement of the vehicle, the control torque is used, said torque formed due to transverse force produced by shifting the center of mass in transverse direction. When shifting mass $m_l$ in transverse direction by a distance l from the longitudinal plane, the vehicle is affected by roll control torque Mc:

$$Mc = m_l \times g \times l$$

where g is gravitational acceleration.

Due to the fact that support structure does not apply a roll torque to the body, the control torque is transferred through the gyroscope frame 13 to the gyroscope rotor 12 and causes it to precess around a vertical axis, thus rotating the gyroscope frame. Body 1 and wheels 8, 9 rotate along with the gyroscope frame 13 by means of control system 28, and the direction of vehicle movement changes. At zero movement velocity, the vehicle rotates in place, and at velocity other than zero, the vehicle moves along a certain radius. During movement along radius R with velocity V, the vehicle is affected by centrifugal force $F_{cf}$ applied in transverse plane to the center of mass:

$$Fcf = m \times \frac{V^2}{R}$$

where m is the total mass of the vehicle.
Said force creates centrifugal torque Mcf:

$$Mcf = Fcf \times H$$

If the direction of rotation $\Omega$ of gyroscope rotor 12 coincides with the direction of rotation of wheels 8, 9 around axles thereof, the centrifugal torque Mcf and the control torque Mc are of opposite sign, and the total torque Mg acting upon the gyroscope rotor 12 will be smaller than the control torque:

$$Mg = Mc - Mcf$$

If such direction of rotation of rotor 12 is selected, the control system 28 (by means of negative feedback) does not allow the vehicle to take sharp turns at high velocities. The direction of vehicle movement velocity with such relation of rotational directions of rotor 12 and wheels 8, 9 is the primary direction, which is defined as forward movement.

Movement in the opposite direction, or rearward movement, is possible only at low velocities, wherein the torque of centrifugal force is low compared to the control torque. At high velocities, the rearward movement can lead to stability loss due to positive feedback thus formed.

Knowing the longitudinal velocity V, the value of established vehicle rotation velocity $\omega_\psi$ can be determined, said velocity coinciding with the velocity of gyroscope rotor precession $\omega_p$ under the effect of control torque Mc:

$$Mg = Mc - Mcf$$

$$\omega\psi \times K = Mc - m \times V \times \omega\psi \times H$$

$$\omega\psi = \omega p = \frac{Mc}{K \times (1 + m \times H \times V / K)}$$

where K is gyroscope rotor angular momentum.

The radius value R of vehicle movement trajectory is inversely proportional to the value of control torque Mc:

$$R = \frac{V}{\omega p} = \frac{V}{\omega\psi} = V \times K \times (1 + m \times H \times V / K) / Mc$$

However, due to transient control deviation and transitional processes in the control system, the rotational velocity $\omega_\psi$ of the body 1 is generally not equal to precession velocity $\omega_p$. By measuring the precession velocity $\omega_p$ of rotor 12 using an angular velocity gyroscopic sensor 26 mounted on the gyroscope frame 13, the on-board computer of the control system 28 calculates the value of total acting roll torque using the above equations, and uses said data to improve its operation. Said signal can also be used for setting the vehicle to initial position prior to operation.

The shift in the center of mass used for obtaining control effect can be provided in various ways. The control torque can be formed by displacing specific load in transverse plane of the vehicle. Heavy parts of the vehicle, e.g. the battery, can be used to form said load.

In a personal vehicle with a rider on board, the transverse control effect is achieved by shifting body of the rider transversally relative to the vehicle, which allows for directional control without any additional means.

The control moment can be obtained by tilting the body 1 of the vehicle around the roll axis. This possibility is provided by means of support structure which allows free rotation of the body around the roll axis, and by means of the torque drive 20 adapted to apply rotational torque to gyroscope rotor 12 around the axis of gyroscope frame 13. Tilting control of body 1 includes two sequential steps. In the first step, the body 1 is tilted, and the control torque is formed. In the second step, the vehicle is moved along a set trajectory with a constant tilting angle of body 1. It is contemplated that the duration of the second step exceeds the duration of the first step.

Figure 12:
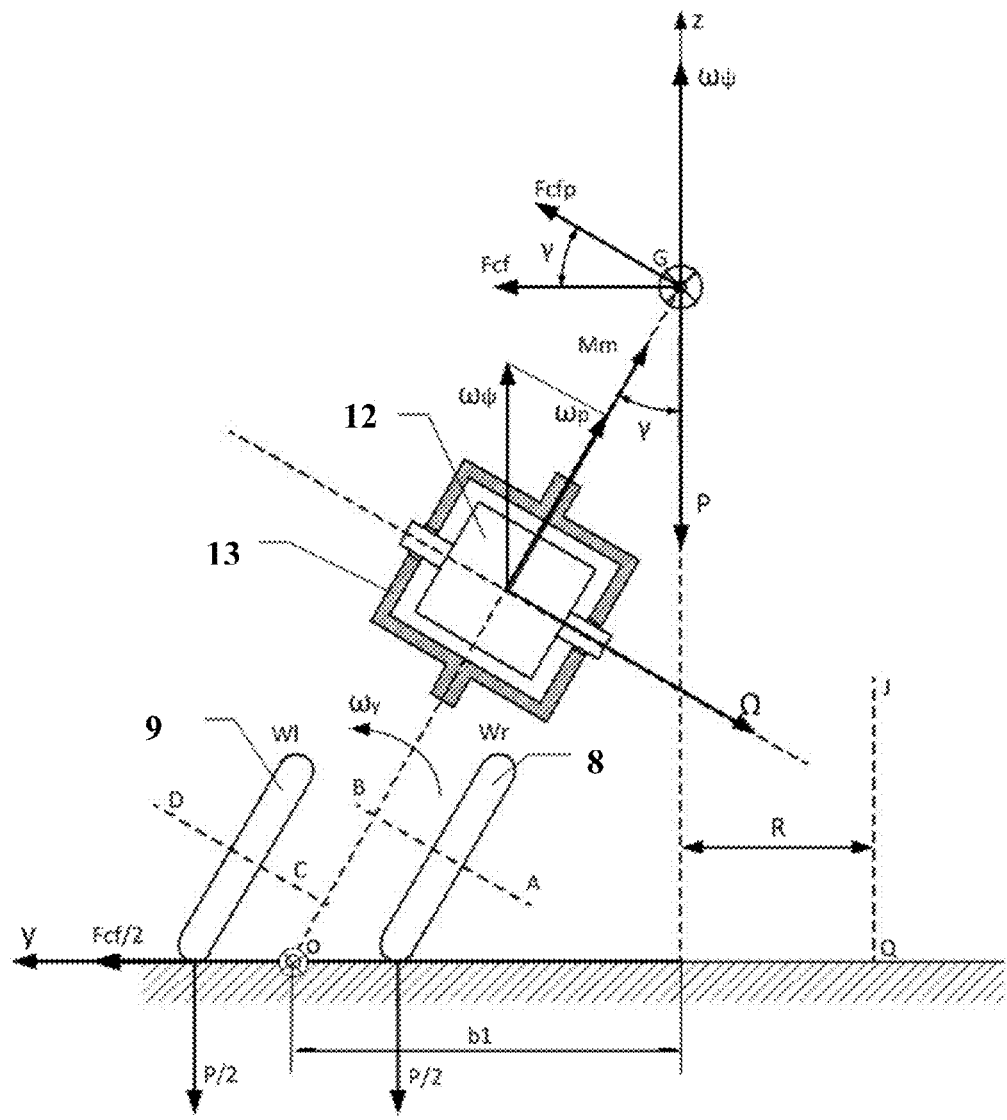
FIG. 12 is a schematic illustration of force and torque action in implementation of the directional control method disclosed in the present invention, by tilting the vehicle body.

FIG. 12 shows a chart of forces and torques affecting the vehicle with body 1 tilted in transverse plane (roll) at an angle γ. This position of the vehicle body 1 corresponds to the second step. FIG. 12 shows a rear view. The longitudinal velocity vector V is directed perpendicular to the plane of the drawing in a direction away from the observer, and said vector passes point O located centrally between wheels 8, 9. roll axis also passes through said point.

The value of control torque Mc depends on tilting angle value γ, the height of center of mass H and the body weight P:

$$P = m \times g$$

$$Mc = P \times H \times \sin \gamma$$

The rotational velocity of body 1 around a vertical axis provided by the control system in an established mode is:

$$\omega\psi = \frac{\omega p}{\cos \gamma}$$

When moving at velocity V, the vehicle is also affected by the centrifugal force Fcf. The value thereof is determined by the movement velocity V and the rotational velocity of the body $\omega\psi$:

$$Fcf = m \times V \times \omega\psi$$

Said force creates torque around the roll axis:

$$Mcf = Fcf \times H \times \cos\gamma$$

$$Mcf = m \times H \times V \times \omega\psi \times \cos\gamma$$

The difference between the control torque McMc and the centrifugal torque McfMcf is balanced by the gyroscopic torque MgMg of the freely precessing gyroscope rotor 12:

$$Mg = Mc - Mcf$$

The rotor 12 precession velocity under the effect of total torque is:

$$\omega p = Mg/K$$

where K is rotor angular momentum.
Consequently, it can be stated that:

$$\omega\psi \times K \times \cos\gamma = m \times g \times H \times \sin\gamma - m \times V \times \omega\psi \times H \times \cos\gamma$$

$$\omega\psi = m \times g \times H \times \sin\gamma / (K \times \cos\gamma + m \times V \times H \times \cos\gamma)$$

At low angle $\gamma$, the following is true:

$$\sin\gamma \approx \gamma$$

$$\cos\gamma \approx 1$$

Consequently, it can be stated that:

$$\omega\psi = m \times g \times H \times \gamma / (K + m \times H \times V)$$

The above equation shows that directional rotational velocity of the vehicle is proportional to the roll angle and decreases when the longitudinal velocity increases.

Thus the vehicle moves in an established mode around a circle with radius R around an axis of rotation QJ:

$$R = V/\omega\psi$$

$$R = V \times (K + m \times V \times H) / m \times g \times H \times \gamma$$

The above equation shows that the radius of the circle is inversely proportional to roll angle and increases when velocity of the vehicle increases.

It must be noted that due to lack of rotational torque effect, the force of gravity and the centrifugal force are distributed equally between both wheels regardless of tilting angle of the body.

In order to rotate body 1 to another position and thus to change the movement trajectory of the vehicle, the vehicle must be rotated around the roll axis. Said rotation is achieved by applying a rotational torque Mm to gyroscope frame 13 around a vertical axis using the torque drive 20. When said torque is applied, the gyroscope rotor 12 is precessed around the roll axis at velocity coy, thus rotating the body 1 of the vehicle. Such rotation is possible when torque Mm generated by torque drive 20 exceeds the total roll torque Mg. In order to produce such torque for the duration of control effect, it is necessary to provide an abutment against the surface for applying forces generating rotational torque, and to eliminate the possibility of additional rotation of body 1 around a vertical axis. For that purpose, the control system 28 stabilizes the current rotational velocity of wheels 8, 9 for the duration of the effect, preventing the wheels from changing rotational velocity under the effect of applied vertical torque. The total torque can also be reduced by applying an additional centrifugal force for a short time. Such additional force can be provided by increasing the rotational velocity of body 1 for the duration of roll effect. The roll torque is applied for a short time in a pulsed manner. The duration of rotation is proportional to the kinetic torque of gyroscope rotor 12 and to the required rotation angle, and is inversely proportional to the value of rotational torque applied by torque drive 20. Said duration must be so short that the movement parameters of the vehicle do not change significantly over such time period. In order to provide short duration of rotation, the torque drive 20 must be adapted to generate high torque over a short time period. Tilting angle is determined by integrating the signal received from the roll angular velocity gyroscopic sensor, which is a part of control system 28. Total roll acting torque is determined by measuring precession velocity of rotor 12 around a vertical axis using a precession angular velocity gyroscopic sensor 26 mounted on the gyroscope frame 13. The process of forming a control torque ends after the body turns to a set angle or after a set rotational velocity of the vehicle is reached.

The control system 28 further comprises an angular velocity gyroscopic sensor of pitching rotation of body 1 (not shown). During the pitching tilting of body 1, a signal from said gyroscopic sensor is transmitted to the control system 28, the on-board computer thereof sends a control signal to the power amplifiers of drives 10, 11 of the wheels 8, 9 to change velocity thereof in order to restore vertical position of the vehicle body. The pitching control of the vehicle is performed using a method widely utilized for vehicles of this type.

Various external forces affect the vehicle during movement. The force of resistance to longitudinal movement is overcome by tilting body 1 of the vehicle and by shifting the center of mass of the vehicle forward on a condition that the horizontal projection of the weight force compensates the force of longitudinal resistance. The equilibrium is maintained in this case by accelerated motion of the wheels forward and backward near the equilibrium point. Longitudinal acceleration or braking of the vehicle is also achieved by changing the tilting angle of the vehicle axis in longitudinal direction (the pitching angle) and thus by forming a horizontal component of weight force, wherein the absolute value thereof can exceed the resistance force if acceleration is needed, and can be lower than said force if braking is needed. The required control torques are generated by drives 10, 11 according to signals from the control system 28. Control system 28 receives a signal from the pitching angular velocity gyroscopic sensor and generates a control effect based on said signal. It must be noted that in order to generate control torque and stabilizing torque, the vehicle body must be able to rotate around the pitching axis. The mechanical gyroscope provided in the vehicle can, in some conditions, create an undesired stabilizing torque at the pitching angle and can inhibit controlled rotation, which can hinder the pitching control channel and prevent it from working properly. In order to remove such inhibition, the control system 28 analyzes the current value of deviation in gyroscope rotor axis and makes a decision to fix the frame using torque drive 20 of the gyroscope frame 13 for the duration of required rotation of the vehicle.

To improve vehicle control, control switches (selectors) are used. Velocity or acceleration selectors (analogous to an accelerator pedal) are used for velocity control, and turn selectors are used for controlling the movement direction. Such switches can be formed by e.g. a 2D joystick or by 2D step plates; the structure thereof is described below.

Figure 13:
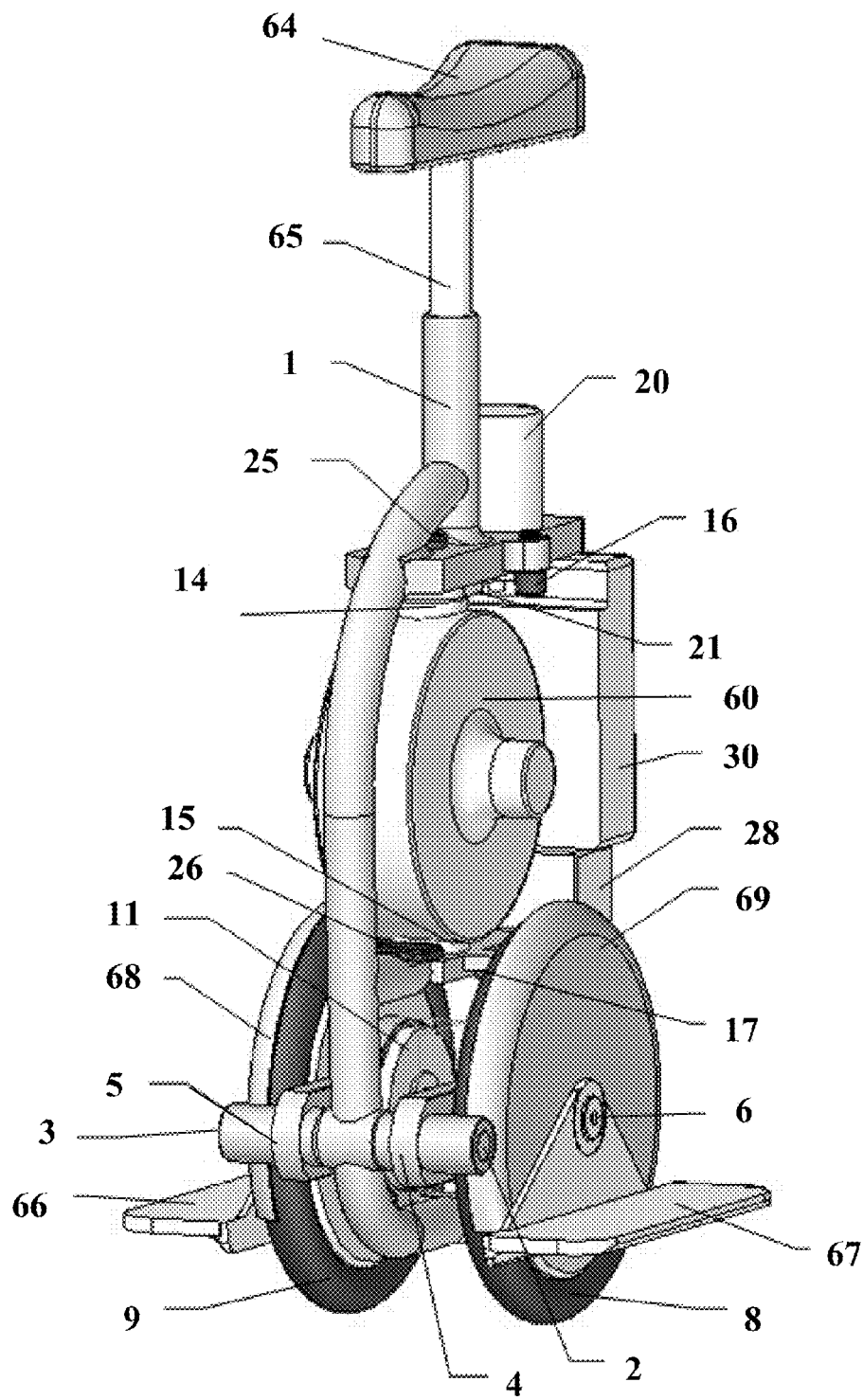
FIG. 13 is a front and side view of the vehicle for carrying a rider according to one embodiment.
Figure 14:
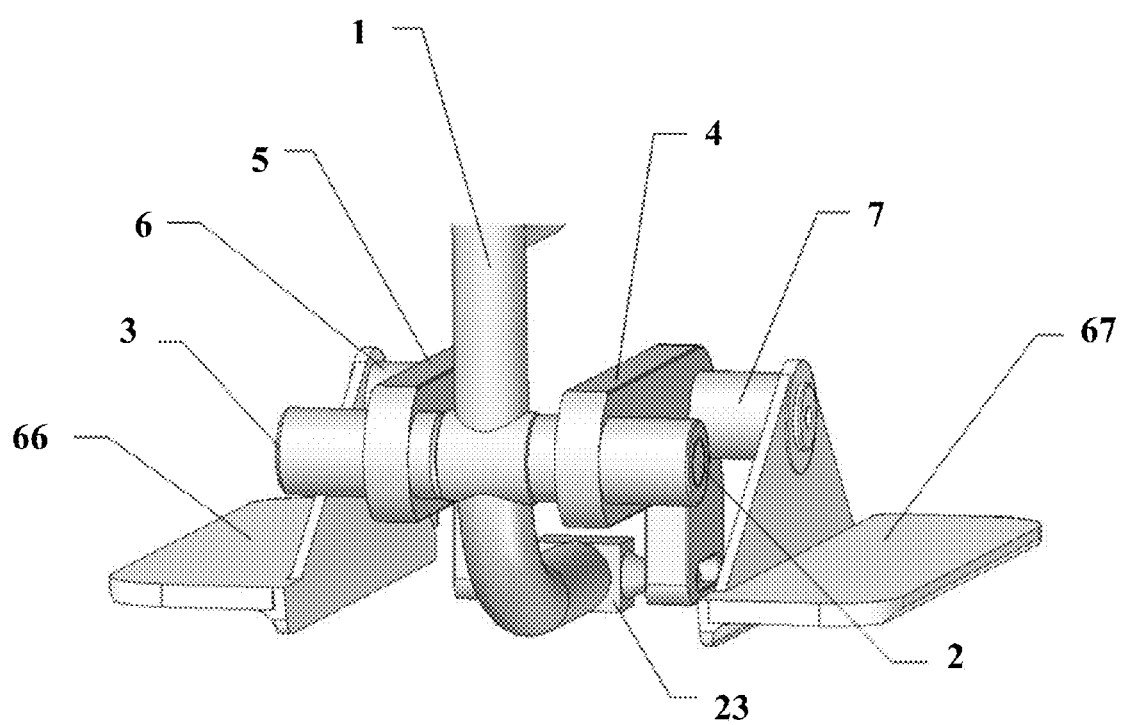
FIG. 14 shows the fixed connection of step supports of the vehicle shown in FIG. 13 to wheel axles.

FIG. 13 shows a vehicle according to another embodiment. Said vehicle is used for carrying a rider and comprises a seat 64 on which the rider controlling the vehicle can sit. Seat 64 is mounted on an adjustable upright 65 adjustably connected to body 1 and adapted to adjust the height of seat 64. Furthermore, a left step plate 66 and a right step plate 67 are mounted on the sides of body 1 for supporting feet of the rider. In this embodiment, plates 66, 67 are fixedly mounted on axles 6, 7. FIG. 14 shows a partial view illustrating how plates 66, 67 are mounted on axles 6, 7. Plates 66, 67 can also be fixedly mounted on the body 1. The vehicle for carrying a rider comprises protective fenders 68, 69 preventing rider's legs from contact with wheels 8, 9, wherein said fenders 68, 69 are fixedly mounted on wheel axles 6, 7 in this embodiment. Plates 66, 67 and fenders 68, 69 are moved along with wheels 8, 9 during movement over rough terrain and during tilting of the vehicle at the roll angle. The vehicle for carrying a rider shown in FIG. 13 also comprises a rate gyroscope, in which the rotor and the rotor drive are received in a sealed housing 60. A high vacuum is maintained in the housing in order to reduce loss during high velocity rotor rotation. The housing 60 also acts as the gyroscope frame. The housing 60 is mounted in bearing supports 14, 15. A segment gear 21 is mounted in interaction with housing 60, said segment gear transferring the rotational torque from the torque drive 20 to housing 60, and thus, to the gyroscope rotor. An angular velocity gyroscopic sensor 26 of rotor precession is also mounted on the housing 60. An angle sensor 25 of the gyroscope frame (i.e. housing 60) rotation with respect to body 1 is mounted on the body 1. Such vehicle is controlled by shifting the weight of the rider in transverse and longitudinal plane.

Figure 15:
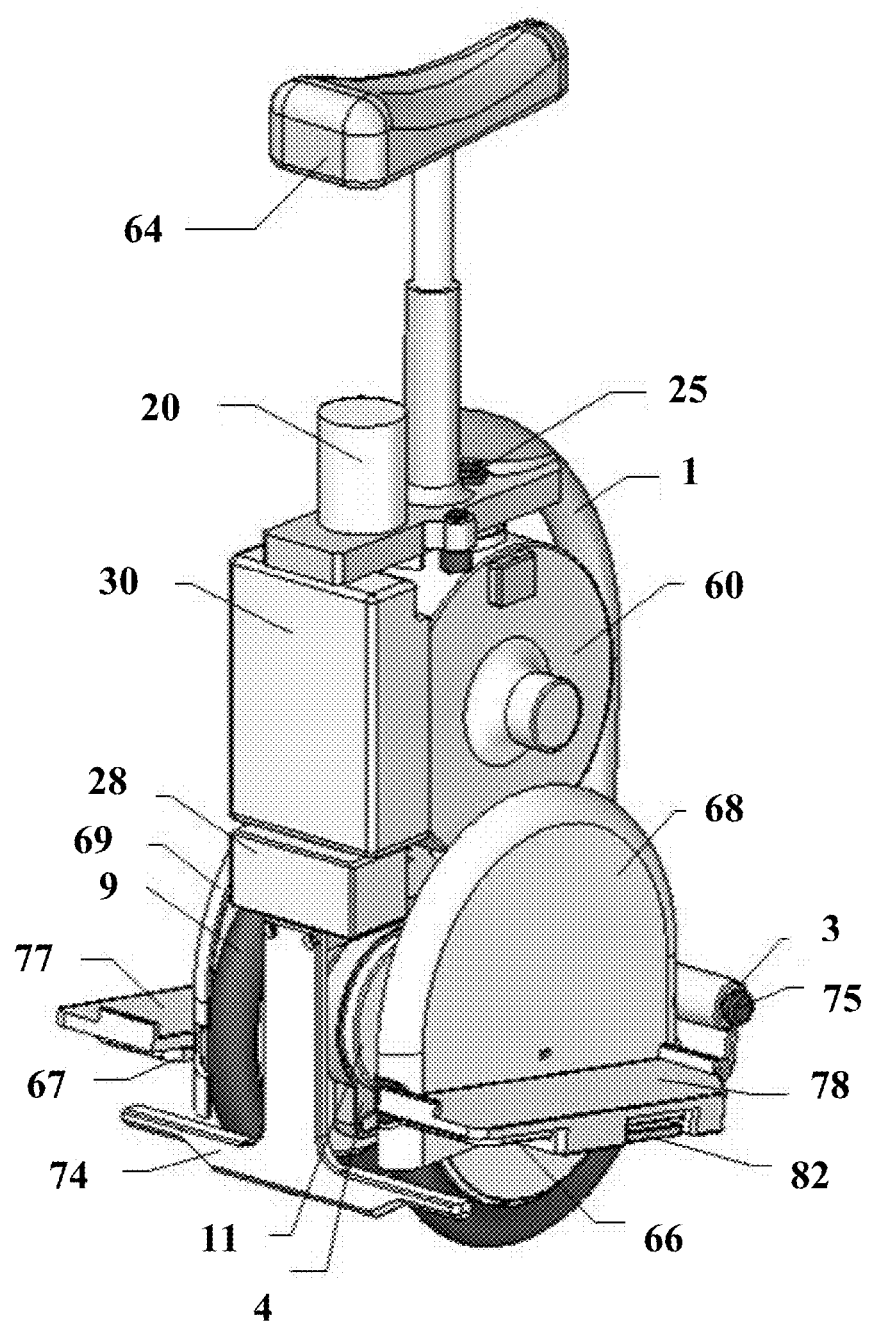
FIG. 15 is a front and side view of the vehicle for carrying a rider according to another embodiment.
Figure 16:
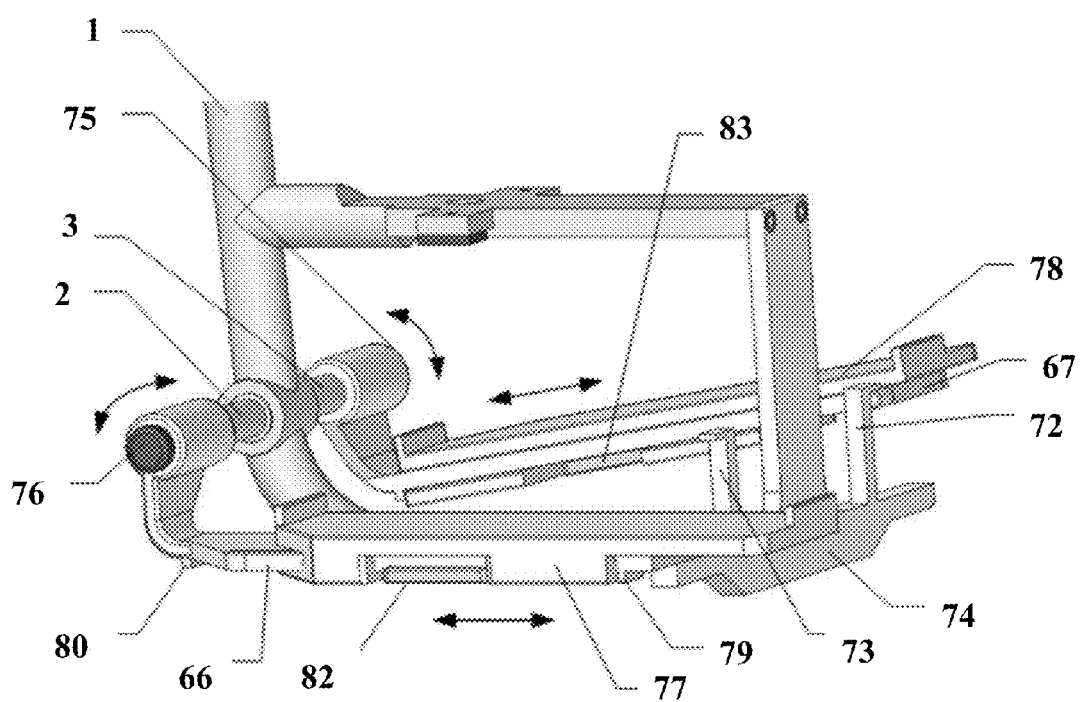
FIG. 16 shows the movable connection of step supports of the vehicle shown in FIG. 15 to the body thereof.

FIG. 15 shows another embodiment of the vehicle for carrying a rider, in which plates 66, 67 are movably mounted on the body 1, namely on the pins 2, 3 of the body 1, and adapted to be rotated with respect thereto. FIG. 16 shows a partial view illustrating how plates 66, 67 are mounted on pins 2, 3. Similarly, plates 66, 67 can be mounted on axles 6, 7 of the wheels.

The angle of rotation of plates 66, 67 is limited by stops 72, 73 of the plates in the upper position, and by a rear bracket 74 in the lower position. Elevation of plates 66, 67 to the upper position is performed via springs (not shown). When the rider's feet are placed on plates 66, 67, said plates are lowered by the weight of the leg, rotating around the pin 2 or 3 until they abut against the rear bracket 74. The leg weight is distributed between the rear bracket 74 and the pin 2 or 3. The plate elevation angle with respect to body 1 is measured by angle sensors 75, 76 fixed on the pins 2, 3. Said angle is approximately equal to the leg elevation value. The signal is sent from sensors 75, 76 to the control system 28, and is used to generate a directional control signal. Supports 77, 78 are movably mounted on plates 66, 67 and adapted for linear displacement. Supports 77, 78 are maintained in a mean position by springs (not shown). The displacement of supports 77, 78 with respect to plates 66, 67 is limited by stops 79, 80. The displacement value of supports 77, 78 with respect to plates 66, 67 is measured by linear displacement sensors 82, 83 mounted on plates 66, 67. When supports 77, 78 are shifted with respect to plates 66, 67 by rider's feet, sensors 82, 83 generate control signals for controlling movement velocity of the vehicle. Said control signals are sent to the control system 28.

Movement velocity of the vehicle changes according to the position of rider's legs. When one foot is elevated, the contact thereof with the support 77, 78 can be lost and support 77, 78 can be in an arbitrary position. In order to eliminate random effect of an elevated support 77, 78, the control system only considers the signal coming from the support 77, 78 located in a support position (pressed against the rear bracket 74 by the foot). Therefore, the rider controls movement velocity with one foot and controls movement direction with the other foot.

In this embodiment, supports adapted to be displaced in two directions by rider's feet are used for controlling velocity and direction of the vehicle. In this case, the movement direction can be set by means of vertical (rotational) support movement, and the velocity of the vehicle can be set by means of horizontal (linear) shift of said supports. Signal from sensors 75, 76, 82, 83 is sent to control system 28. System 28 generates control signals for controlling the left drive 10, the right drive 11 and the torque drive 20, causing the vehicle to move in the direction set by the rider.

Figure 17:
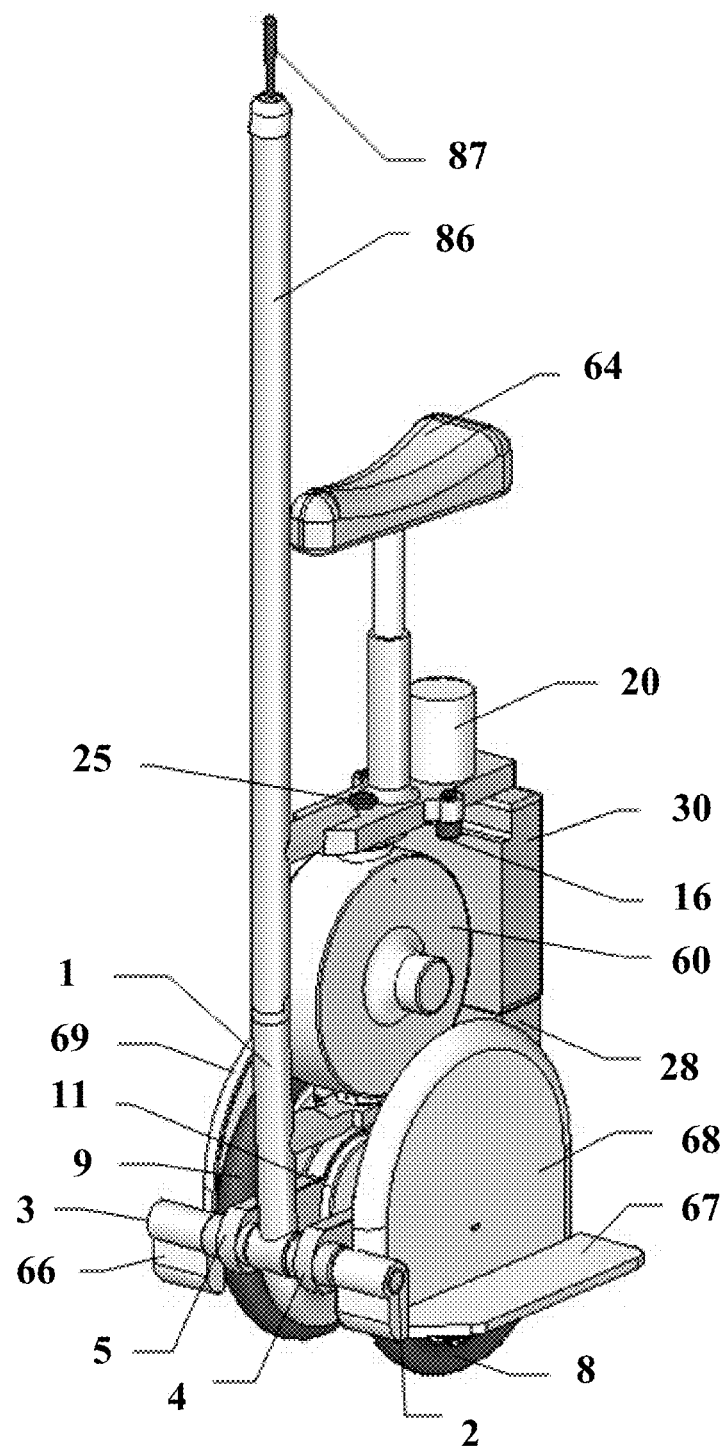
FIG. 17 is a front and side view of the vehicle for carrying a rider according to another embodiment.

FIG. 17 shows an embodiment of the vehicle, in which body 1 comprises a handle 86 adapted to be used as a support for rider's hands. In this embodiment, the control device is formed by a 2D joystick 87 mounted in said handle 86. The movement of joystick forward and backward using rider's hand adjusts the longitudinal movement velocity of the vehicle, while a horizontal tilting of the joystick provides movement direction control. In this embodiment, plates 66, 67 and protective fenders 68, 69 are attached to the body 1 of the vehicle, wherein front parts of the plates 66, 67 are connected fixedly to pins 2,3, and the rear parts are abutted against the bracket 74 fixated to the body 1. During movement, the rider can sit in the seat with his feet placed on plates 66, 67, while holding handle 86 with his hand. The control of the vehicle in this case is performed by both shifting the rider's weight and using the control means.

Figure 18:
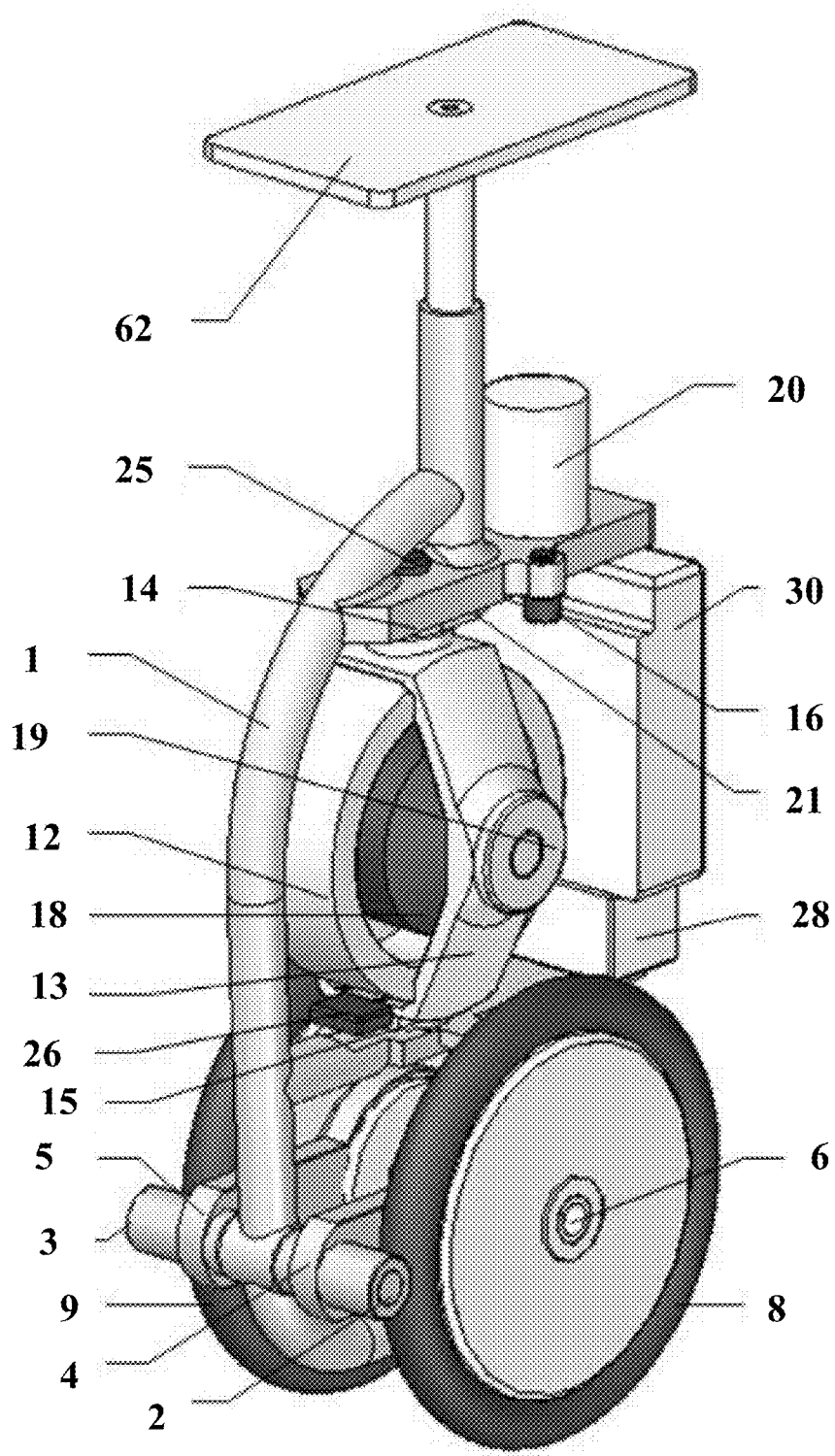
FIG. 18 is a front and side view of the vehicle for carrying a load according to another embodiment.

FIG. 18 shows a vehicle according to another embodiment. Said vehicle is used for carrying a load and comprises a platform for carrying a load; said platform is mounted on the body 1 and can be provided with various means for fixation the load (not shown).

Figure 19:
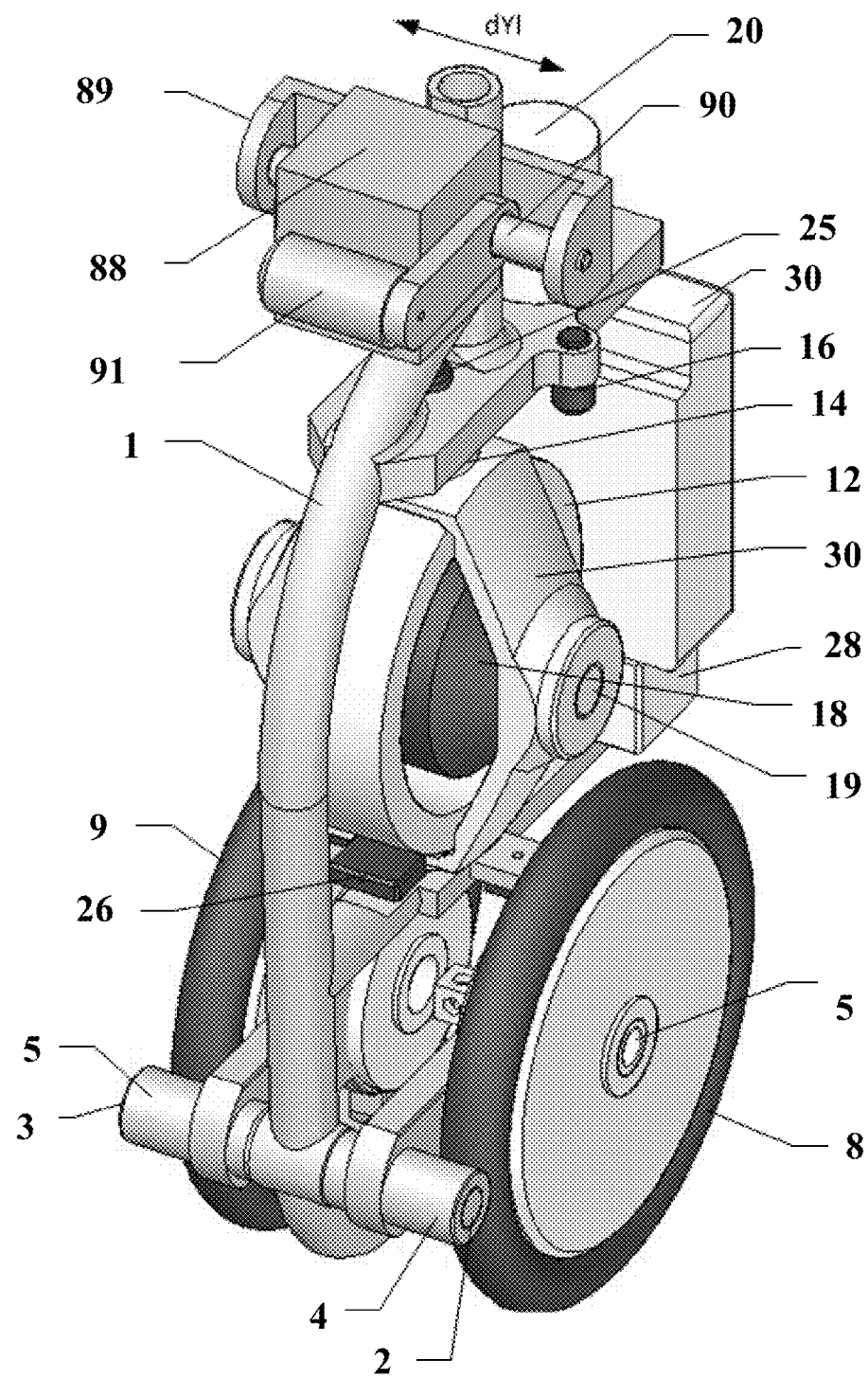
FIG. 19 is a rear view of the vehicle shown in FIG. 18 without the platform for carrying a load.

FIG. 19 shows the vehicle shown in FIG. 18 without the platform for carrying a load. The control torque for controlling the movement of such vehicle is applied by displacing a special load in transverse direction with respect to the center of mass of the vehicle. As shown in FIG. 19, the vehicle comprises a load 88 movably mounted on a bracket 89 and adapted to be displaced in transverse direction. The displacement of load 88 is achieved by means of actuating screw 90 rotatably mounted in the bracket 89 in bearings. The rotation of actuating screw 90 is performed in required direction by means of an actuating screw drive 91 which receives control signals from control system 28. In this embodiment, drive 91 is mounted directly on the control load 88 and is displaced along with the load. In this case, the total mass includes the mass of control load 88 and the mass of drive 91. When the load 88 having mass m is displaced from the mean position by a distance dYl, the vehicle body 1 is affected by control torque Mc:

$$Mc(m, dYl) = m \times dYl$$

Under the effect of said torque, the gyroscope rotor is precessed at a velocity ωp:

$$\omega p = Kg \times Mc$$

Control system 28 rotates vehicle body 1 following the rotation of gyroscope rotor, thus changing vehicle movement direction during progressive motion thereof, or turns the vehicle when it is stationary. In alternative configurations, in order to decrease vehicle mass, the displaced carrying loads can be formed by heavy parts of the vehicle, e.g. the battery or the gyroscope, or the weight application point of the whole vehicle can be displaced by displacing the axle 58 of the rocker 57 with respect to body 1 in transverse direction.

Figure 20:
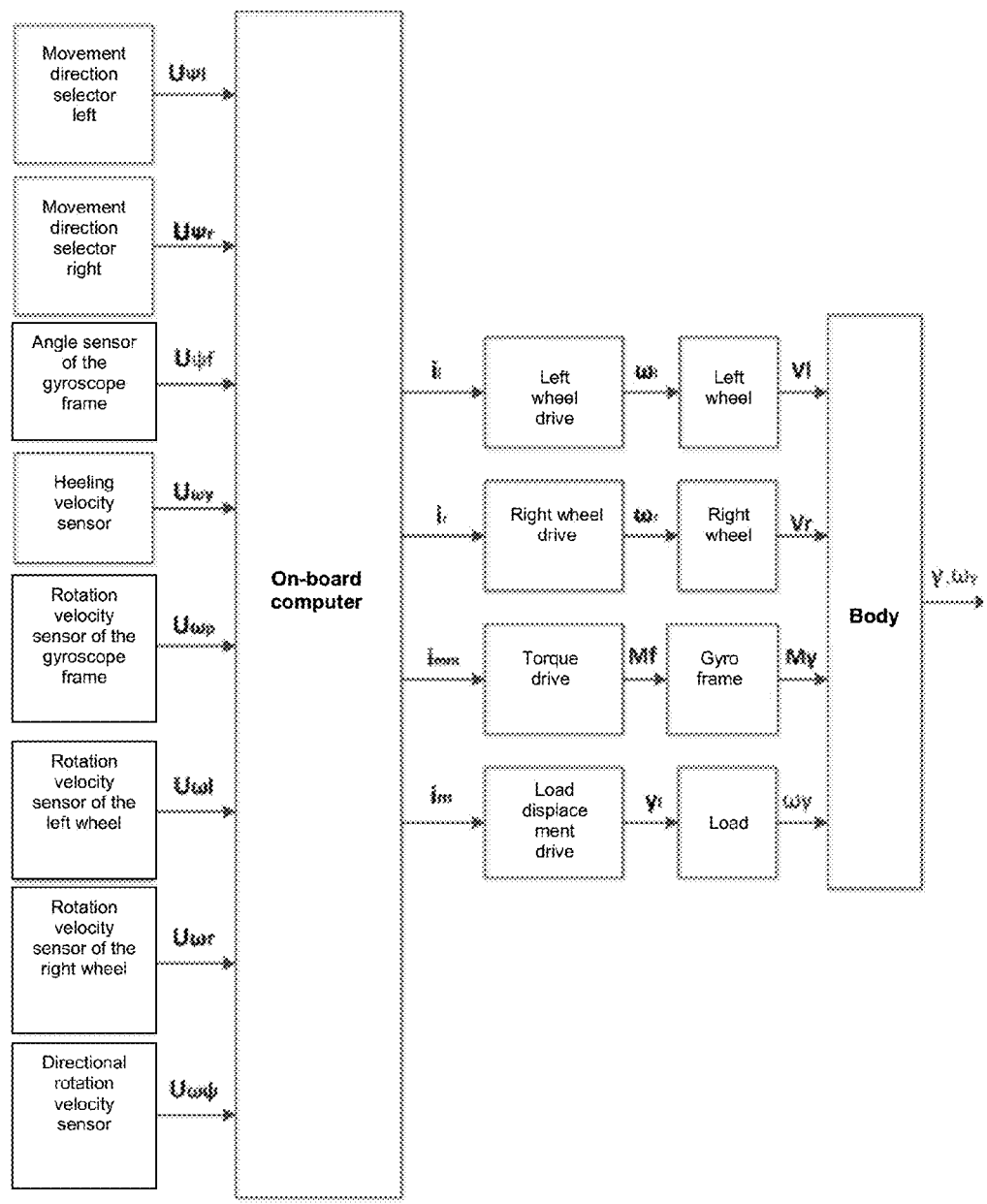
FIG. 20 is a schematic illustration of the control system for controlling the vehicle for carrying a load shown in FIG. 19.

Control system 28 for controlling the vehicle described therein is shown in FIG. 20. System 28 comprises an on-board computer that sends control signals to drives 10, 11 of the wheels, drive 20 or drive 91 based on input data from the vehicle sensor system.

It must be noted that control system 28 is a system with variable structure. The selection of structure of system 28 is performed by the on-board computer and depends on the interrelation of input parameters: the directional control signal value, the longitudinal velocity value and the total transverse torque value, as well as on the current control stage or period. At each stage, the control system analyzes input data received from sensors and selects the appropriate control structure providing the required result.

I claim:

1. A two-wheel gyroscope-stabilized vehicle, comprising:
    a body;
    a left wheel and a right wheel;
    a supporting structure that connects the body and the wheels so that the body is supported by the wheels;
    two wheel drives, each of the wheel drives connected with a corresponding wheel of the left wheel and the right wheel to drive the corresponding wheel;
    a gyroscope, comprising a gyroscope rotor and a gyroscope frame, wherein the gyroscope frame is rotatably mounted on the body;
    at least one angle sensor mounted on the body so as to detect the gyroscope frame rotation relative to the body;
    a control system adapted to receive a signal transmitted by the at least one angle sensor and control rotational velocities of the wheels according to the signal;
    wherein the supporting structure is adapted to move the wheels in relation to each other and to move the wheels in relation to the body independently thereof;
    the control system is further adapted to apply a torque to the gyroscope frame; and wherein axes of rotation of the wheels lie in a first vertical plane and the gyroscope frame is mounted on the body so that an axis of rotation of the frame lies in a second vertical plane which is perpendicular to said first vertical plane, wherein the gyroscope rotor is rotatably mounted in the gyroscope frame so that an axis of rotation of the rotor is perpendicular to said axis of rotation of the frame.

2. The vehicle according to claim 1, wherein the gyroscope frame is mounted on the body so that the axis of rotation of the frame extends at an angle less than 30 degrees relative to said first vertical plane.

3. The vehicle according to claim 1, wherein the control system comprises a torque drive to apply said torque to the gyroscope frame, wherein the torque drive is mounted on the body so as to rotate the gyroscope frame around the axis of rotation of the frame.

4. The vehicle according to claim 1, wherein the gyroscopic frame has at least one angular velocity gyroscopic sensor mounted thereon.

5. The vehicle according to claim 1, wherein the body has two pins and said supporting structure comprises two levers rotatably mounted on said pins, the wheels are rotatably mounted on said levers, and the supporting structure further comprises a load bearing rocker which is rotatably connected to the body, wherein the load bearing rocker also connects to the levers so as to move the levers in relation to each other.

6. The vehicle according to claim 1, wherein the body has two pivots and said support structure comprises two swiveling links rotatably mounted on said pivots, two barrels fixedly mounted on said swiveling links, two cylindrical supports, which are movably mounted in said barrels, wherein the wheels are rotatably connected to the cylindrical supports, and the support structure further comprises a load bearing rocker which is rotatably connected to the body, wherein ends of the load bearing rocker are movably connected with the cylindrical supports.

7. A method of controlling the vehicle according to claim 1, comprising the steps of measuring an angle of rotation of the gyroscope frame relative to the body on application of a disturbing force, and changing a difference of the rotational velocities of the wheels according to the angle of rotation.

8. The method according to claim 7, wherein measuring the angle of rotation of the gyroscope frame is provided by measuring an angle of deflection of the gyroscope frame from position in which the axis of rotation of the gyroscope rotor is perpendicular to the second vertical plane, and the difference of rotational velocities of the wheels is varied to compensate the angle of deflection.

9. The method of directional control of the vehicle as in claim 1, comprising the steps of applying a roll control force to the body; measuring an angle of rotation of the gyroscope frame relative to the body; and changing a difference of the rotational velocities of the wheels according to the angle of rotation.

10. The method according to claim 9, wherein measuring the angle of rotation of the gyroscope frame is provided by measuring the angle of deflection of the gyroscope frame from position in which the axis of rotation of the gyroscope rotor is perpendicular to the second vertical plane, and directional control of the vehicle is provided by changing the difference of the rotational velocities of the wheels to compensate the angle of deflection.

11. The method according to claim 9, wherein the roll control force is applied to the body by means of control load movement.

12. The method according to claim 9, wherein the roll control force is applied to the body by tilting the body by means of a torque drive and the gyroscope.

13. The method according to claim 9, wherein the roll control force is applied to the body by shifting a weight of a rider.

14. A two-wheel gyroscope-stabilized vehicle for carrying a rider, comprising:
    a body;
    a left wheel and a right wheel;
    a supporting structure that connects the body and the wheels so that the body is supported by the wheels;
    two wheel drives, each of the wheel drives connected with a corresponding wheel of the left wheel and the right wheel, to drive the corresponding wheel;
    a gyroscope, comprising a gyroscope rotor and a gyroscope frame, wherein the gyroscope frame is rotatably mounted on the body;
    at least one angle sensor mounted on the body so as to detect the gyroscope frame rotation relative to the body;
    a control system is adapted to receive a signal transmitted by the at least one angle sensor to control rotational velocities of the wheels according to the signal;

wherein the vehicle further comprises a pair of step plates to support legs of the rider, the supporting structure is adapted to move the wheels in relation to each other and to move the wheels in relation to the body independently thereof;

the control system is further adapted to apply a torque to the gyroscope frame, and wherein axes of rotation of the wheels lie in a first vertical plane and the gyroscope frame is mounted on the body so that an axis of rotation of the frame lies in a second vertical plane which is perpendicular to said first vertical plane, wherein the gyroscope rotor is rotatably mounted in the gyroscope frame so that an axis of rotation of the rotor is perpendicular to said axis of rotation of the frame.

15. The vehicle according to claim 14, wherein the body has a rider seat.

16. The vehicle according to claim 14, wherein the wheels are rotatably mounted on wheel axles connected with the support structure, wherein the vehicle further comprises a pair of step supports to support the legs of the rider, and wherein the step supports are fixedly mounted on the axles.

17. The vehicle according to claim 14, wherein the vehicle further comprises a pair of step supports to support the legs of the rider, wherein said step supports are rotatably mounted on the body and comprise the step plates movably mounted on said step supports, and wherein the control system comprises angle sensor of the step supports and linear displacement sensors of the step plates and is adapted to control rotational velocities of the wheels according to signals of the sensors.

18. The vehicle according to claim 14, wherein the wheels are rotatably mounted on wheel axles connected with the support structure, the vehicle further comprises a pair of step supports to support the legs of the rider, and said step supports are rotatably mounted on the wheel axles and comprise the step plates movably mounted on said step supports, and wherein the control system comprises angle sensor of the step supports and linear displacement sensors of the step plates and is adapted to control rotational velocities of the wheels according to signals of the sensors.

19. The vehicle according to claim 14, wherein the body comprises a handle mounted thereon.

20. A method of directional control of the vehicle according to claim 14, comprising the steps of applying roll control force to the body; measuring the angle of rotation of the gyroscope frame relative to the body; and changing a difference of rotation velocities of the wheels according to the angle of rotation.

21. The method according to claim 20, wherein measuring the angle of rotation of the gyroscope frame is provided by measuring an angle of deflection of the gyroscope frame from position in which the axis of rotation of the gyroscope rotor is perpendicular to the second vertical plane, and directional control of the vehicle is provided by changing the difference of rotation velocities of the wheels to compensate the angle of deflection.

22. The method according to claim 20, wherein the roll control force is applied to the body by means of control load movement.

23. The method according to claim 20, wherein the roll control force is applied to the body by tilting the body by means of a torque drive and the gyroscope.

24. The method according to claim 20, wherein the roll control force is applied to the body by shifting the weight of the rider.

25. The vehicle according to claim 14, wherein the control system comprises a torque drive to apply said torque to the gyroscope frame, wherein the torque drive is mounted on the body so as to rotate the gyroscope frame around the axis of rotation of the frame.

26. The vehicle according to claim 14, wherein the body has two pins and said supporting structure comprises two levers rotatably mounted on said pins, the wheels are rotatably mounted on said levers, and the supporting structure further comprises a load bearing rocker which is rotatably connected to the body, wherein the load bearing rocker also connects to the levers so as to move the levers in relation to each other.

27. The vehicle according to claim 14, wherein the body has two pivots and said support structure comprises two swiveling links rotatably mounted on said pivots, two barrels fixedly mounted on said swiveling links, two cylindrical supports, which are movably mounted in said barrels, wherein the wheels are rotatably connected to the cylindrical supports, and the support structure further comprises a load bearing rocker which is rotatably connected to the body, wherein ends of the load bearing rocker are movably connected with the cylindrical supports.

28. The vehicle according to claim 14, wherein the gyroscope frame is mounted on the body so that the axis of rotation of the frame extends at an angle less than 30 degrees relative to said first vertical plane.

29. The vehicle according to claim 14, wherein the gyroscopic frame has at least one angular velocity gyroscopic sensor mounted thereon.

30. The method of controlling the vehicle as in claim 14, comprising the steps of measuring the angle of rotation of the gyroscope frame relative to the body on application of a disturbing force, and changing a difference of rotation velocities of the wheels according to the angle of rotation.

31. The method according to claim 30, wherein measuring the angle of rotation of the gyroscope frame is provided by measuring the angle of deflection of the gyroscope frame from position in which the axis of rotation of the gyroscope rotor is perpendicular to the second vertical plane, and the difference of rotation velocities of the wheels is varied to compensate the angle of deflection.

* * * * *